United States Patent
Volpe et al.

(10) Patent No.: US 10,630,596 B1
(45) Date of Patent: Apr. 21, 2020

(54) FORWARDING ACTION REDIRECTION

(71) Applicant: Amazon Technologies, Inc., Seattle, WA (US)

(72) Inventors: Thomas A. Volpe, Austin, TX (US); Mark Anthony Banse, Austin, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 581 days.

(21) Appl. No.: 15/385,256

(22) Filed: Dec. 20, 2016

(51) Int. Cl.
*H04L 12/801* (2013.01)
*H04L 12/861* (2013.01)
*H04L 29/06* (2006.01)
*H04L 12/823* (2013.01)
*H04L 12/935* (2013.01)

(52) U.S. Cl.
CPC .............. *H04L 47/33* (2013.01); *H04L 47/32* (2013.01); *H04L 49/3063* (2013.01); *H04L 49/9094* (2013.01); *H04L 69/22* (2013.01)

(58) Field of Classification Search
CPC ... H04L 49/3063; H04L 47/33; H04L 12/801; H04L 12/823; H04L 29/06
See application file for complete search history.

(56) References Cited

U.S. PATENT DOCUMENTS

| | | | | |
|---|---|---|---|---|
| 2015/0245226 | A1* | 8/2015 | Lewallen | H04W 40/34 370/225 |
| 2016/0344612 | A1* | 11/2016 | Ovsiyenko | H04L 49/25 |
| 2017/0086111 | A1* | 3/2017 | Vrzic | H04W 36/023 |
| 2017/0195254 | A1* | 7/2017 | Pham | H04L 49/25 |
| 2017/0302470 | A1* | 10/2017 | Clark | H04L 41/0893 |
| 2017/0331737 | A1* | 11/2017 | Ruan | H04L 69/22 |
| 2017/0339074 | A1* | 11/2017 | Melman | H04L 47/2441 |
| 2018/0115483 | A1* | 4/2018 | Onno | H04L 45/306 |

\* cited by examiner

*Primary Examiner* — Charles C Jiang
*Assistant Examiner* — Voster Preval
(74) *Attorney, Agent, or Firm* — Kilpatrick Townsend & Stockton LLP

(57) ABSTRACT

Provided are systems and methods for modifying a forwarding decision for a packet being processed by a network device. The forwarding decision can include a final determination whether to forward the packet from the network device and onto a network. In various implementations, an integrated circuit device of the network device can receive packet information for the packet, where the packet information includes a forwarding decision. The forwarding decision can include a decision type. The integrated circuit device can further determine a redirection includes using the decision type. The redirection information can include a redirection entry for each of one or more decision types. The integrated circuit device can further modify the packet information using values from the particular redirection entry, excluding modification of values associated with an outbound packet header that can be used to forward the particular packet.

22 Claims, 15 Drawing Sheets

FORWARDING ACTION REDIRECTION

BACKGROUND

A network typically includes various network devices connected together using network infrastructure devices, such as gateway devices, switches, routers, hubs, repeaters, and so on. Many network devices include hardware and software configured to send and receive packets. In such a device, the sending and the receiving can include determining whether a packet can be forwarded from the device, and if so, where the packet should go. The device may not be connected to the device at the destination address, but the device can send the packet to another network device or network infrastructure device that is on a path to the destination device.

To determine where to send a packet, a network infrastructure device generally processes the packet to determine where the packet is supposed to go, how the packet is going to get there, and/or whether a device has the information it needs to determine what to do with the packet. In this processing of the packet, the device can also determine that the packet should not be forwarded, and instead should be dropped. For example, the device may find that it cannot process the packet for one reason or another, and thus cannot determine a destination to which to forward the packet.

To process a packet, a network infrastructure device can include one or more integrated circuit devices. One of the integrated circuit devices can include circuitry, such as a pipeline, for processing packets. The pipeline can be configured to make a final forwarding decision for a packet, where the forwarding decision can describe whether to forward the packet, where to forward the packet to, and/or a manner in which to forward the packet. Once the device has a final forwarding decision from the pipeline, the network infrastructure device can send the packet into the network, where one or more other network infrastructure devices can further forward the packet to its destination.

BRIEF DESCRIPTION OF THE DRAWINGS

Various embodiments in accordance with the present disclosure will be described with reference to the drawings, in which.

DETAILED DESCRIPTION

Figure 1:
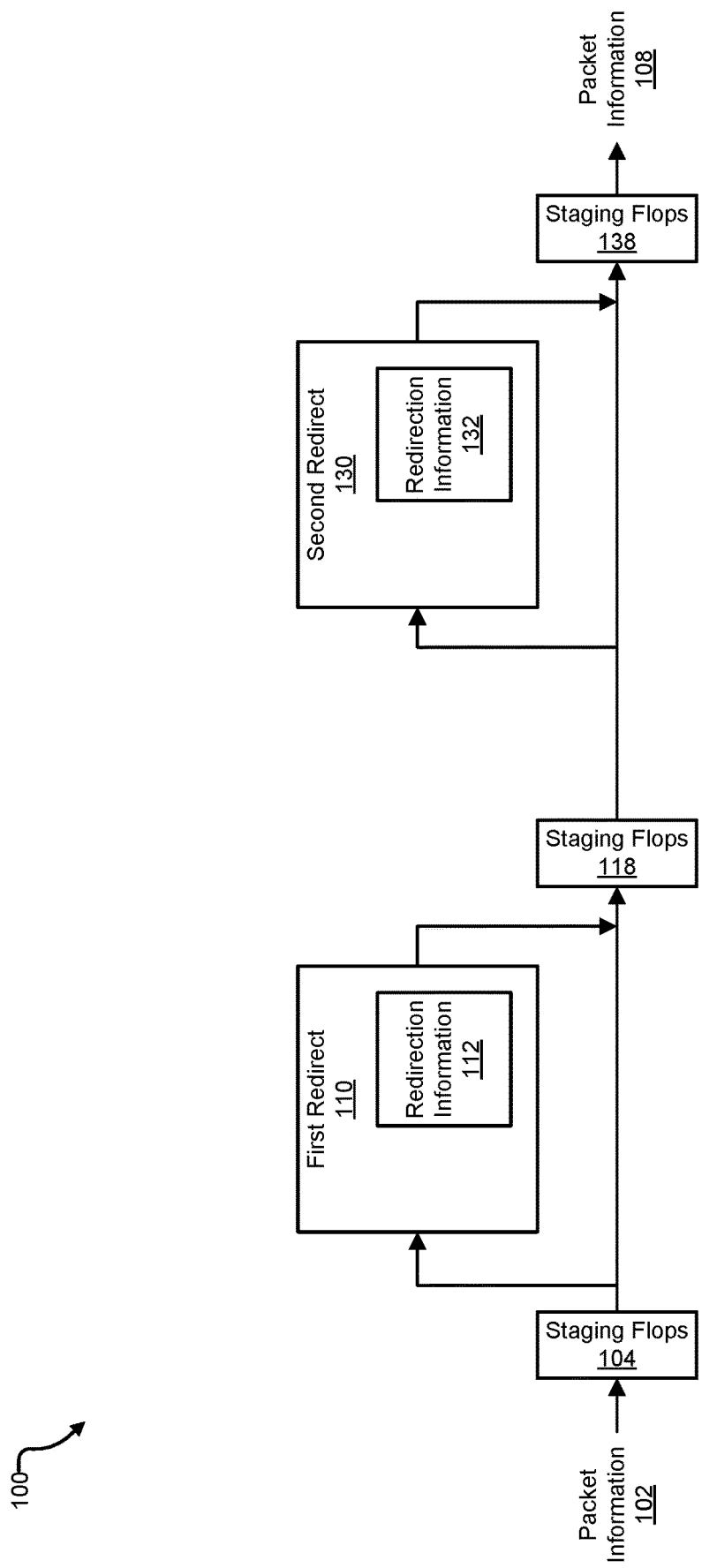
FIG. 1 illustrates an example of a redirection circuit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network typically includes various network devices connected together using network infrastructure devices, such as gateway devices, switches, routers, hubs, repeaters, and so on. Many network devices include hardware and software configured to send and receive packets. In such a device, the sending and the receiving can include determining whether a packet can be forwarded from a device, and if so, where the packet should go. For example, Internet Protocol version 4 (IPv4) and Internet Protocol version 6 (IPv6) packets include source and destination addresses. A network infrastructure device may not be connected to the device at the destination address, but—similar to a physical envelope mailed from San Francisco first going to Newark, N.J. before going to its final destination in New York City—the network infrastructure device can send the packet to another network device or network infrastructure device that is on the way to the destination device.

Network infrastructure devices thus generally process packets to determine where each packet is supposed to go, how the packet is going to get there, and/or whether a device has the information it needs to determine what to do with the packet. To process a packet, a network infrastructure device can include one or more integrated circuit devices, as well as physical ports and/or Wi-Fi antennas or other antennas for connecting the network infrastructure device to a network and sending and receiving packets. One of the integrated circuit devices can include circuitry, such as a pipeline, for processing packets. Once such a device makes a final determination as to where and how to send a packet, the network infrastructure device can send the packet into the network, where one or more other network infrastructure devices can further forward the packet to its destination.

Hundreds of thousands of packets may traverse a single network infrastructure device, such as a switching or routing device, within a given second. When there is a problem with the switching or routing device, it may be difficult to view the activity at the switching or routing device. Without such a view, it can be very difficult to identify and understand the problem, or even if there is a problem. The problem may even be with another part of the network, but be manifested at the particular switching or routing device. The problem can be evidenced by, for example, an excessive number of packets being dropped by the device, a high rate of packet processing errors being reported by the device, slowness at the device, and/or connections being dropped by the device, among other things.

A network administrator can attempt to identify problems with a switching or routing device by, for example, changing the configuration of the device. For example, the network administrator can change a routing table or an access control list to attempt to send packets that may identify a problem to local processor or a monitoring device in the network. Changing the configuration of the device, however, may interfere with the flow of packets through the device, potentially causing other problems to arise. In some cases, modifying the configuration of the device in order to debug the device may even hide or mask the problem.

In various implementations, a switching or routing device can thus include a packet redirection circuit, which can change a forwarding decision made by the switching or routing device. In various implementations, the redirection circuit can receive the forwarding decision, where the forwarding decision is determined by, for example, a pipeline circuit that processes the packet. The forwarding decision can be provided to the redirection circuit when the processing of the packet concludes. The forwarding decision can include a decision type and, at least in some cases, an associated action. The decision type can include information that identifies or classifies a packet. Alternatively, the decision type can include a value indicating a reason the forwarding decision could not be properly determined. The action can include a value indicating whether to forward or drop a packet, and/or a value indicating whether or not to send the packet to a local processor.

In various implementations, the redirection circuit can potentially change the forwarding decision determined by the packet processing logic, or may add information to the information provided by the forwarding decision. For example, in some implementations, the forwarding decision can include an action, where the action can indicate whether to forward or drop the packet, and/or whether or not to send a copy of the packet to a local processor. In these implementations, the redirection circuit may, for packets with particular decision types, replace the action with an alternate action. As another example, in some implementations, the redirection circuit can determine a class for packets with certain decision types. As another example, in some implementations, the redirection circuit can determine whether packets with some decision types should be mirrored, meaning having a copy sent to a mirror location. In various implementations, decision types can be associated with other information that can be added to the packet information for a packet, such as for example priorities, mirror locations, mirror rates, and quality of service information, among other things.

Generally, programming the redirection circuit can be accomplished without causing undue interference with normal packet processing operations. Since the redirection circuit operates on a final forwarding decision made for the packet, the redirection circuit does not interfere with normal packet processing, and can be configured to let many or all packets to be forwarded as determined by the forwarding decision. Additionally, packet redirection can be enabled for only so long as necessary or desired, and the enabling and disabling of the redirection can be accomplished without undue effect on the flow of packets through a network device. For example, redirection of packets having a decision type that may be related to a problem can be enabled, so that these packets can be collected for analysis. In this example, once a sufficient number of packets have been collected, redirection of these packets can be turned off.

FIG. 1 illustrates an example of a redirection circuit 100. In various implementations, the example redirection circuit 100 can be implemented using an integrated circuit, or a combination of integrated circuits. In various implementations, the example redirection circuit 100 can be included in a larger integrated circuit or device, such as a switching or routing device. In these and other implementations, the redirection circuit 100 can receive input signals from other circuits or devices, and provide output signals to other circuit or devices.

In this example, the redirection circuit 100 has been implemented as a two-stage pipeline circuit. In this pipeline, the first stage includes a first redirect 110 circuit and the second stage includes a second redirect 130 circuit. In various implementations, the redirection circuit 100 receives packet information 102 as input, and outputs packet information 108, which may be the same as the input packet information 102 or may be a modified version of the input packet information 102. In various implementations, the redirection circuit 100 can include additional pipeline stages, not illustrated here, that have additional logic. In various implementations, the redirection circuit 100 can be implemented in a form other than as a pipeline circuit; for example, the redirection circuit 100 can be implemented using combinational logic.

The redirection circuit 100 can receive the input packet information 102 at a first set of staging flops 104. Packet information can include one or more fields extracted from a packet. For example, the packet information 102 can include fields extracted from a header of the packet, such as source and destination addresses, Virtual Local Area Network (VLAN) identifiers, flags, and so on. In some cases, packet information can also include data extracted from a payload of the packet.

In some cases, packet information can also include values determined as a result of processing the packet. For example, the packet information 102 can include packet header fields that have been modified or rewritten as a result of processing the packet, such as for example an updated time-to-live field. Results from processing the packet can also include a forwarding decision. The forwarding decision can include a final determination as to whether to forward the packet from a particular network device and onto a network. As discussed further below, in various implementations, the redirection circuit 100 can use the forwarding decision to change the input packet information 102 and/or to add information to the input packet information 102. The final determination for the packet is generally unaffected, though a path for the packet may be. Packet information can also be referred to as packet metadata.

The redirection circuit 100 generally does not operate on the packet itself, which can be stored elsewhere. In various implementations, the input packet information 102 includes the information the redirection circuit 100 uses to determine a redirection, such that the redirection circuit 100 does not need the packet itself. The input packet information 102, in most cases, is also smaller than the packet. For example, a maximum transmission unit (MTU) may set the maximum size of packets at 1500 bytes, while the packet information for such a packet may be only 40 to 60 bytes.

In the illustrated example, redirection circuit 100 receives the input packet information 102 at a first set of staging flops 104. The first set of staging flops 104 hold and pass the input packet information 102 between clock cycles. For example, between one clock cycle and the next, the first set of staging flops 104 provides the input packet information 102 for a particular packet to the first redirect 110 circuit. In the same clock cycle, input packet information 102 for a different packet may arrive at inputs to the first set of staging flops 104. At the next clock cycle, this new input packet information 102, for the different packet, can be latched by the first set of staging flops 104, and be provided to the first redirect 110 circuit.

In some implementations, the first redirect 110 circuit receives some values from the input packet information 102 while the remaining values are provided directly to a second set of staging flops 118. In these implementations, the first redirect 110 circuit can receive only the values that the first redirect 110 circuit will operate on. The first redirect 110 circuit may subsequently provide modified versions of these values, the same values, and/or additional values to the second set of staging flops 118, where these values are included in the input packet information 102 when the data at the inputs to the second set of staging flops 118 are latched by the second set of staging flops 118.

In various implementations, the first redirect 110 circuit can use the forwarding decision provided by the input packet information 102 to change the forwarding decision, and/or to determine additional information about the packet that is associated with the input packet information 102. As noted above, the forwarding decision can include a final determination as to whether to forward the packet from a particular network device and onto a network. "Final," in this context, means that the forwarding decision and the input packet information 102 provide sufficient information to put the packet onto the network. The forwarding decision can thus encompass the result of ordinary network operations for moving network traffic through a particular network device.

The operation of the redirection circuit 100, in contrast, is outside of normal processing of packet. As discussed further below, the redirection circuit 100 can be configured to make limited changes, or no changes, to the input packet information 102. The redirection circuit 100 generally does not change a final determination for a packet. For example, the redirection circuit 100 generally does not modify values in the input packet information 102 that can be used in a header for an outbound packet. Instead, the final determination may be left intact, and only the forwarding of the packet may be changed.

In some cases, the forwarding decision may be incomplete. For example, a network device may have not been able to understand the contents of a packet. In this example, the forwarding decision may include only some of the information needed to put the packet onto the network. The forwarding decision can also include a reason for the forwarding decision being incomplete.

In various implementations, the forwarding decision can include a decision type. In some cases, the decision type can include a value indicating an identity or classification for a packet. For example, the value can identify or classify the packet as a broadcast or multicast packet. As another example, the value can identify or classify the packet as one in which the source address is not known. As another example, the value can identify or classify the packet as one in which a VLAN check failed.

In other cases, the decision type can include a value that indicates a reason the forwarding decision could not be completely determined. For example, the value can indicate that a network device could not parse the packet, and thus may not have been able to understand the contents of the packet. As another example, the value can indicate that a network device read an invalid table entry in processing the packet, and thus may not have routing or switching information for the packet. In each of these examples, the network device may not be able to determine whether to forward the packet and/or where to forward the packet to. In these examples, ordinary processing of the packet can include resolving the reason a forwarding decision for the packet could not be determined. For example, packet information for the packet can be sent to a local processor, which may be able to determine a forwarding decision. The reason the forwarding decision could not be completely determined may also be referred to herein as an event.

In various implementations, the forwarding decision can also include an action. An action can include a value indicating whether to forward a packet and/or a value indicating whether to send a copy of the packet to a local processor. The value indicating whether to forward the packet can indicate whether a network device can forward a packet onto the network. When the packet cannot be forwarded, the network device can drop the packet. When the packet can be forwarded, the packet information can include information such as a destination address for the packet and/or information describing a path through a network to the destination address. The value indicating whether to send a copy a packet to a local processor can cause such a copy to be made and sent.

In various implementations, a network device can include an integrated circuit device designed to execute instructions (e.g., software instructions) and, based on the instructions, manipulate and control the network device. Such an integrated circuit device is commonly called a processor. In some implementations, a single integrated circuit can include a processor, a packet processing circuit, and the redirection circuit 100. In some implementations, the processor is implemented as one integrated circuit, while the packet processing circuit is implemented as a separate circuit, which can include the redirection circuit 100. In these implementations, the processor circuit and the packet processing circuit can be in the same package (e.g., a physical enclosure including pins to connect the packet to a printed circuit board) or in different packages.

In some cases, a decision type may indicate that a packet may benefit from being inspected by a local processor, or that the packet requires being inspected by the local processor. For example, when the decision type indicates that the source Media Access Control (MAC) address for the packet is not known and should be learned, the action accompanying the decision type may have a value set to cause a copy of the packet to be sent to the local processor. In this example, the local processor can manage the learning of the source MAC address. As another example, the decision type may indicate a destination MAC address miss, meaning that, in processing the packet, the destination MAC address for the packet was not found. In this example, the packet may be sent to the local processor to determine why the destination MAC address was not known, and/or to locate the destination MAC address.

In various implementations, the redirection circuit 100 can, in some cases, change the forwarding decision for a particular packet. For example, the first redirect 110 circuit can include a memory, such as a type of Random Access Memory (RAM), which can store redirection information 112. The redirection information 112 can contain an entry for each decision type, where each entry can include values that can be added to the input packet information 102, or that can be used to modify the input packet information 102. At each clock cycle, the first redirect 110 circuit can, for the input packet information 102 currently being presented by the first set of staging flops 104, index the redirection information 112 using the decision type from the forwarding decision in the input packet information 102. From the indexed location, the first redirect 110 circuit can obtain an entry, which the first redirect 110 circuit can use to modify the input packet information 102.

As one example of values that can be used to modify the input packet information 102, the entry provide by the redirect information 112 can include one or more alternate actions. Using a particular action from the input packet information 102, the first redirect 110 circuit can select an alternate action from among the one or more alternate actions. For example, when the original action was to drop the packet that is associated with the input packet information 102, the alternate action can be to drop the packet and send a copy to the local processor. As another example, when the original action was to forward the packet to a destination and send a copy to the local processor, the alternate action can be to drop the packet and not send a copy to the local processor. In some cases, a particular entry in the redirection information 112 can be programmed to not change the action for a certain decision type, in which case the first redirect 110 circuit may output the original action instead of an alternate action.

The first redirect 110 circuit in this way provides a way to change the path of a packet, independently of normal and ordinary processing used to determine a forwarding decision for the packet, and without having to modify any packet processing. Redirecting a packet can be used, for example, for debugging. A network device may be misconfigured, resulting in, for example, an excessive number of packets being dropped by the device. Without being able to see the contents of the dropped packets, it may be difficult to determine whether the packets should or should not have been dropped, and if not, what needs to be done to prevent the packets from being dropped.

Debugging the switch or routing device can be accomplished without the redirection circuit 100. For example, the device may include an access control list, which can be used to filter, forward, and/or selectively redirect packets passing through the device. Thus the access control list can be used to redirect some packets to a local processor, where the packets can be examined. Access control lists, however, are typically used in the ordinary processing of packets. Thus, modifying an access control list may disrupt the flow of packets through a device. Additionally, debugging the device may involve multiple attempts to isolate packets related to the problem, and thus multiple changes to the access control list and more disruptions to the flow of packets through the device. It could also be that the problem may be in the access control list itself, in which case modifying the access control list may mask the problem.

Thus, in various implementations, the first redirect 110 circuit can be configured to redirect certain packets to the local processor for analysis. Packets can be collected for a short time, and then the redirection can be disabled so that the local processor is not unnecessarily burdened. This process can be repeated, with different packets being redirected and collected, until the problem can be isolated. During this debugging process, normal packet processing should not be affected, and packets unrelated to the problem can flow through the device without interference. Additionally, since normal packet processing is not reconfigured, it is less likely that the problem will be hidden by having packets being redirected.

The redirection circuit 100 can be used for purposes other than debugging a switch or routing device that includes the redirection circuit 100. For example, packets can be redirected to attempt to identify network configuration problems, such as incorrectly connected cables or incorrectly configured addresses at other devices. As another example, when the local processor is particularly busy (such as when analyzing redirected packets to identify a problem), non-critical packets that would be sent to the local processor can be redirected. As another example, packets can be redirected to attempt to identify network attacks. For example, a switch or routing device may be receiving a large number of packets where the source MAC address of the packets is not known, which may indicate a denial of service (or similar) attack. Such packets can be redirected to be examined, without other network traffic through the device being affected.

In various implementations, the redirection information 112 can be stored in a circuit other than a memory. For example, the redirection information 112 can be stored or programmed into a combinatorial logic circuit, such as an "if-then-else" type circuit or a decision tree circuit.

In various implementations, entries in the redirection information 112 can include values other than, or in addition to, alternate actions. For example, an entry in the redirection information 112 can include a class. A class, in this context, is an alphanumeric value that can be used to classify, identify, and/or prioritize a packet. For example, a class value can be used to place a packet in a particular processor queue. To determine a class for a packet, the first redirect 110 circuit can index the redirection information 112 using a decision type from the forwarding decision provided by the input packet information 102. The redirection information 112 can provide an entry corresponding to the decision type, and the entry can include a class. The first redirect 110 circuit can output the class, so that the class can be included in the packet information 102

As another example, an entry in the redirection information 112 can include a mirror indicator. A mirror indicator can indicate whether to mirror a packet. Mirroring involves making a copy of a packet, and sending the packet to a mirror location. The mirror location can be a local processor, or can be a monitoring destination on a network. The first redirect 110 circuit can output the mirror indicator for inclusion in the packet information 102.

In various implementations, entries in the redirection information 112 can include additional or alternative values. For example, an entry can include a priority that can be assigned to packets having a particular decision type. As another example, an entry can include a mirror location, which, when mirroring is enabled, can be used to identify a destination for mirrored packets. As another example, an entry can include a mirror rate. A mirror rate can indicate the rate at which mirrored packets are sent. For example, the mirror rate can indicate that one out of every ten mirrored packets are to be sent. In this example, the remaining nine packets would be mirrored, but instead the mirror copy is not generated nor sent. Entries in the redirection information 112 can include various other information, such as values related to control of quality of service.

In some cases, the first redirect 110 circuit does not modify the input packet information 102, or may make a modification that does not affect the forwarding of the packet. For example, an entry provided by the redirect information 112 may contain alternate actions, but the alternate action selected is the same as the original action from the input packet information 102. As another example, the entry may include a class, but the input packet information 102 may be configured to disable adding a class to the input packet information 102. As another example, the entry may include a mirror indicator, which, when added to the input packet information 102 enables mirroring, but the mirror location may not be set, and so the packet will not, in fact, be mirrored.

In the illustrated example, outputs from the first redirect 110 circuit can be provided to a second set of staging flops 118. The second set of staging flops 118 can, at the next clock cycle, present the outputs from the first redirect 110 circuit, as well as any other values from the input packet information 102, to a second redirect 130 circuit.

In various implementations, the redirection circuit 100 can include the second redirect 130 circuit that includes additional or alternate redirection information 132. For example, in some implementations, the forwarding decision in the input packet information 102 may have two decision types, where one indicates an identification or classification for a packet and the other indicates an event. In these implementations, the redirection circuit 100 can be configured to use the first redirect 110 circuit to modify the input packet information 102 using one decision type (e.g., the identification or classification), and to use the second redirect 130 circuit to modify the input packet information 102 using the other decision type (e.g., the event). In these implementations, the redirection information 132 in the second redirect 130 circuit may have entries with similar information (e.g., alternate actions, classes, mirror indicators, etc.) as is included in entries in the redirection information 112 in the first redirect 110 circuit. Alternatively or additionally, the redirection information 132 in the second redirect 130 circuit may have different information than is included in the other redirect information 110.

In various implementations, the first redirect 110 circuit may be in a different pipeline stage than the second redirect 130 circuit because there may be intermediate pipeline stages between the first redirect 110 circuit and the second redirect 130 circuit that use the result of the first redirect 110 circuit. In some implementations, the first stage of the redirection circuit 100 may include other logic, such that the redirection circuit 100 can be more efficiently implemented by having the second redirect 130 circuit be in a separate pipeline stage.

In some implementations, the input packet information 102 may be modified by the second redirect 130 circuit based on modifications by the first redirect 110 circuit. For example, the original action in the input packet information 102 may have been to forward a packet to a destination, and the first redirect 110 circuit may have changed the original action to dropping the packet. In this example, the second redirect 130 circuit may, based on the action being to drop the packet, change the action to dropping the packet and sending a copy to the local processor. In some cases, the modification made by the second redirect 130 circuit may be made using the original action, disregarding any change made to the action by the first redirect 110 circuit.

In some cases, the first redirect 110 circuit may not have made a redirection determination, in which case any redirection may be made only by the second redirect 130 circuit. For example, in some implementations, when an event occurred, a valid bit in the input packet information 102 may be unset, such that the input packet information 102 is treated as not valid by the first redirect 110 circuit. In this example, the first redirect 110 circuit may ignore the input packet information 102. As another example, in some cases, the redirection information 112 in the first redirect 110 circuit may not have been configured to change the forwarding decision for a packet, while the redirection information 132 in the second redirect 130 circuit has been configured to change the forwarding decision for the same packet. The inverse may also be the case, where the first redirect 110 circuit is configured to change the forwarding decision for a particular packet, while the second redirect 130 circuit is not.

In various implementations, the second redirect 130 circuit may receive only the forwarding decision from the input packet information 102, while any other values in the input packet information 102 proceed directly to a third set of staging flops 138. The second redirect 130 circuit may output a modified forwarding decision, the same forwarding decision when the redirection information 132 is not programmed to change the forwarding decision, and/or additional values when the redirection information 132 provides additional values. The outputs of the second redirect 130 circuit can be provided to the third set of staging flops 138. At a next clock cycle, the third set of staging flops 138 can provide output packet information 108, which may be the same as the input packet information 102, or may include modified or additional values. The output packet information 108 can subsequently be used by other modules, such as for example circuits that cause the packet associated with the output packet information 108 to be forwarded or dropped, and/or be copied to a local processor.

In various implementations, the second redirect 130 circuit can alternatively be used to modify packet information for packets that include a special flag or other indicator, which identifies a packet as being of a special type. Special types of packets can include packets having a particular network type and/or some other specific information. For example, special types of packets can be defined for debugging a network and/or network devices in the network. In various implementations, the second redirect 130 circuit (or, in some implementations, the first redirect 110 circuit) can be used to modify the forwarding decision for packets having a special type. For example, these packets can be sent to a local processor, and/or be removed from further transmission in the network. Alternatively or additionally, the second redirect 130 circuit can be used to mirror packets having the special type to a mirror location. In these implementations, the redirection information 132 can be indexed using the special packet type. In these implementations, the second stage redirect 130 circuit may override modifications made by the first redirect 110 circuit to the forwarding decision.

Figure 2:
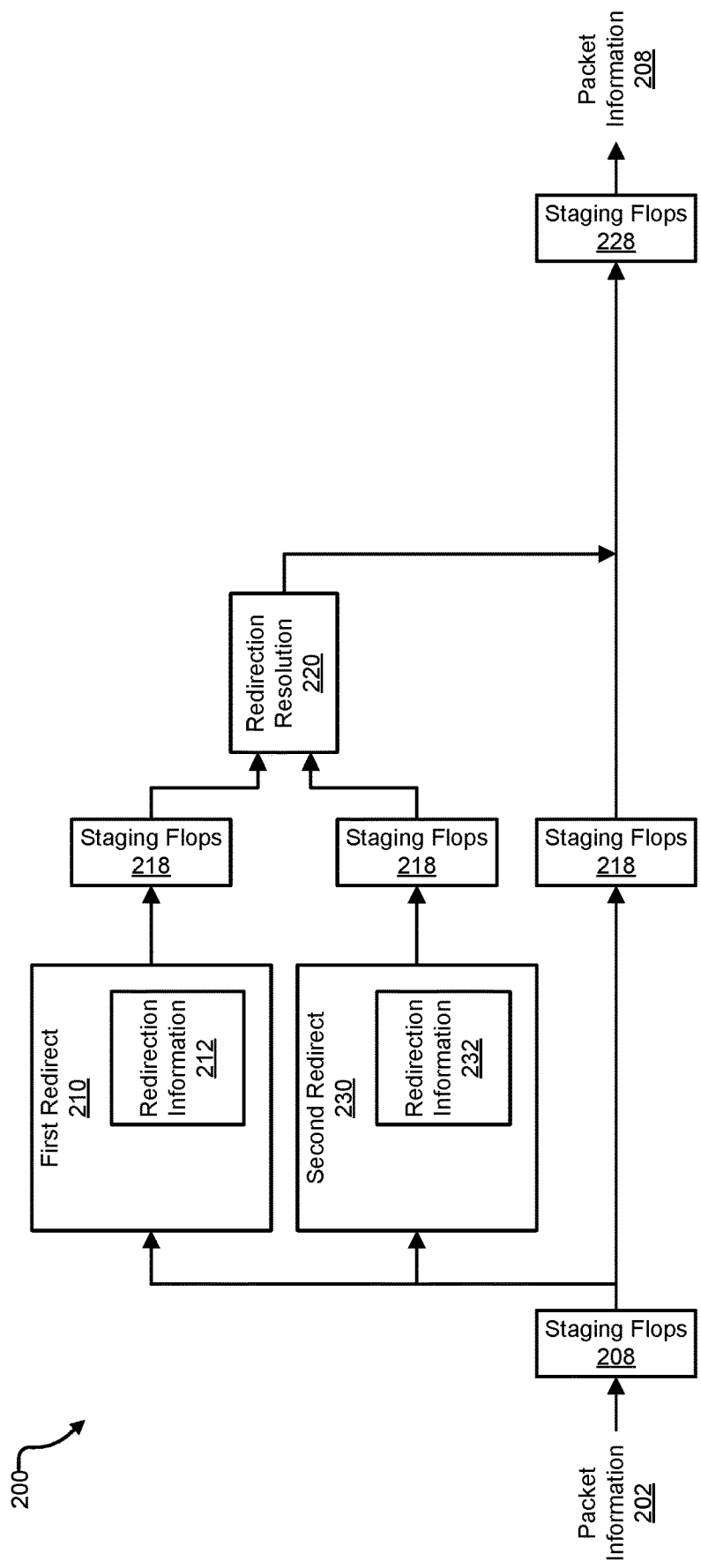
FIG. 2 illustrates another example of a redirection circuit.

FIG. 2 illustrates another example of a redirection circuit 200. In various implementations, the example redirection circuit 200 can be implemented using an integrated circuit, or a combination of integrated circuits. In various implementations, the redirection circuit 200 can be included in a larger integrated circuit or device, such as a switching or routing device. In these and other implementations, the redirection circuit 200 can receive input signals from other circuits or devices, and provide output signals to other circuits or devices.

In the illustrated example, the redirection circuit 200 is implemented as a two-stage pipeline. The first stage includes a first redirect 210 circuit and second redirect 230 circuit, and the second stage includes a redirection resolution 220 circuit. In various implementations, the redirection circuit 200 can be implemented in a form other than as a pipeline, such as for example using combinational logic. In the illustrated example, the redirection circuit 200 receives, at a first clock cycle, input packet information 202 for a particular packet, at a first set of staging flops 208. At the next clock cycle, the first set of staging flops 208 can present the input packet information 202 to the first stage of the pipeline.

In various implementations, may have two redirection circuits 210, 230 in the first stage of the pipeline so that the redirection circuit 200 can process a forwarding decision in the input packet information 202 in two different ways at the same time. For example, in some implementations, the forwarding decision can include two decision types, where one can be, for example, a forwarding determination based on ingress processing, and the other can be, for example, a forwarding determination based on egress processing. In this example, the first redirect 210 can use one decision type (e.g., the forwarding determination based on ingress processing) to modify the input packet information 202, while the second redirect 230 circuit can use the other decision type (e.g., the forwarding determination based on egress processing) to modify the input packet information 202.

In these and other examples, the first redirect 210 circuit can include redirection information 212 whose entries can include alternate actions, classes, mirror indicators, mirror locations, mirror rates, and/or priorities, among other things, for each available decision type, or for a subset of decision types. The second redirect 230 circuit can also include redirection information 232, which can be indexed with the same decision types as are used to index the redirection information 212 in the first redirect 210 circuit, and/or can be indexed with different decision types. The entries in the redirection information 232 in the second redirect 230 circuit can further include similar values as are stored in the other redirection information 212, or can include different values.

In some cases, both the first redirect 210 circuit and the second redirect 230 circuit modify the input packet information 202 or provide additional values. In some cases, neither the first 210 nor the second 230 redirect circuits modify the input packet information 202. In some cases, only one of the first 210 or second 230 redirect circuits modify the input packet information 202.

The first redirect 210 circuit and the second redirect 230 circuit can provide modified (or possibly unmodified) packet information and/or additional values to a second set of staging flops 218. Any values from the input packet information 202 not used by the first 210 and second 230 redirect circuits can also be provided to the second set of staging flops 218. At a next clock cycle, the outputs from the first 210 and second 230 redirect circuits and the input packet information 202 can be latched by the second set of staging flops 218, and be provided to the second stage of the pipeline.

In the illustrated example, the second stage of the pipeline includes a redirection resolution 220 circuit. In various implementations, each of the first 210 and second 230 redirect circuit can provide a forwarding decision for a packet, which may have been modified from forwarding decisions provided by the input packet information 202. In some implementations, the redirection circuit 200 may be configured to provide a single forwarding decision. Thus, in these implementations, the redirection resolution 220 circuit can receive, by way of the second set of staging flops 218, the possibly modified forwarding decisions from the first 210 and second 230 redirect circuits. The redirection resolution 220 circuit can resolve any possible conflicts between the different forwarding decisions, and output single forwarding decision.

In various implementations, the redirection resolution 220 circuit may use various rules to resolve possible conflicts between the forwarding decisions from the two redirect circuits 210, 2030. Such rules can be, for example, ignoring the forwarding decision from the second redirect 230 circuit when the forwarding decision determined by the first redirect 210 circuit is to drop the packet. As another example, the redirection resolution 220 circuit may combine (e.g., using logical OR) the forwarding decisions determined by each of the first redirect 210 and second redirect 230 circuits when the forwarding decision from first redirect 210 circuit is to forward the packet. In some cases, the redirection resolution 220 circuit may be configured to favor the forwarding decision from one or the other of the first 210 or second 230 redirect circuits. In some cases, the redirection resolution 220 circuit may be configured to favor the forwarding decision that has a particular class (e.g., the highest class or the lowest class).

In some implementations, the redirection circuit 200 of FIG. 2 may not have the redirection resolution 220 circuit, and instead outputs the separate forwarding decisions determined by each of the first 210 and second 230 redirect circuits. In these implementations, each forwarding decision may be used by another circuit or device to determine whether and/or how to forward the packet.

In the illustrated example, the redirection resolution 220 circuit can output a possibly modified forwarding decision, and possible additional values determined by the first 210 and/or second 230 redirect circuits. In some cases, the forwarding decision may be unmodified from the forwarding decision in the input packet information 202. The outputs from the redirection resolution 220 circuit and any other values from the input packet information 202 can be provided to a third set of staging flops 228. At the next clock cycle, the input packet information 202 can be provided as output packet information 208, to be used by another circuit or device.

In various implementations, a redirection circuit can include a combination of the pipeline stages, or the circuitry included in the pipeline stages, illustrated in FIGS. 1 and 2. For example, a redirection circuit can include a first redirect circuit in parallel with a second redirect circuit in a first pipeline stage, a redirection resolution circuit in a third pipeline stage, and a third redirect circuit in a fourth pipeline stage. In this example the first redirect circuit may modify packet information based on a forwarding decision determined by ingress processing, while the second redirect circuit may make a redirection determination based on a forwarding decision determined by egress processing. In this example, the redirection resolution circuit can combine the forwarding decisions provided by the first and second redirect circuits. Lastly, the third redirect circuit can modify input packet information based on an event. Other examples can include various combinations of parallel and sequential redirect circuits, optionally with one or more redirection resolution circuits.

Figure 3:
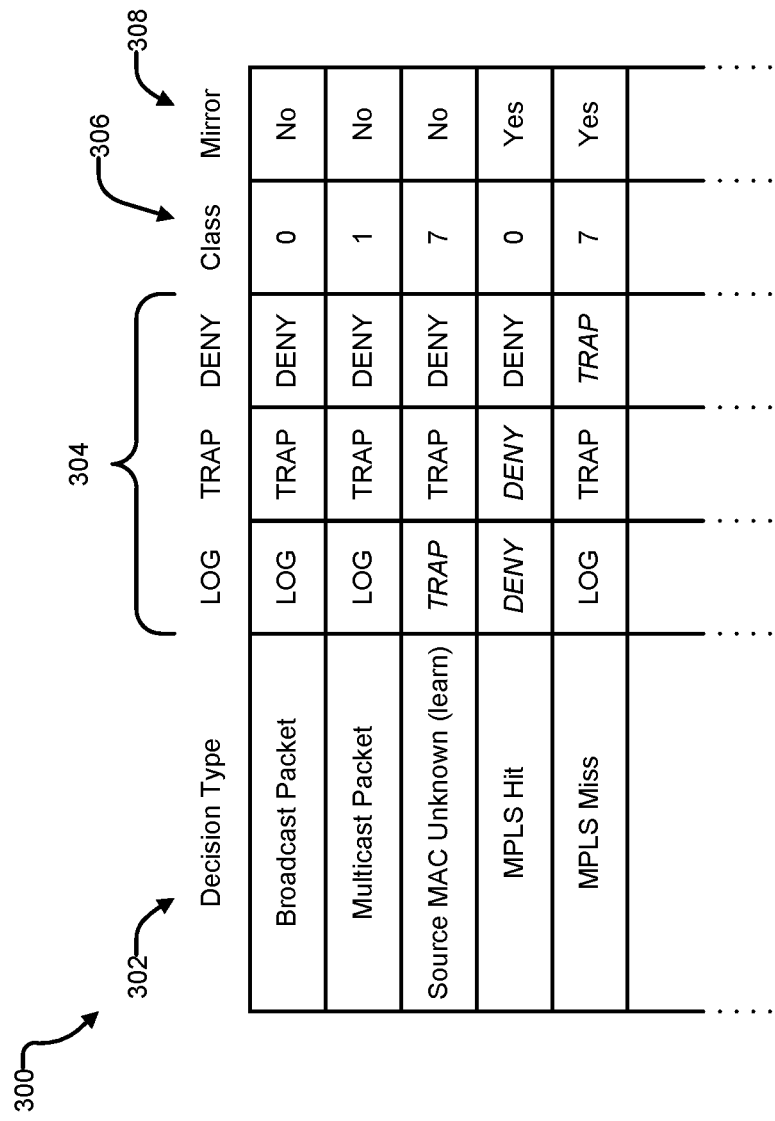
FIG. 3 illustrates an example of redirection information.

FIG. 3 illustrates an example of redirection information 300, such as may be used by the redirection circuits illustrated in FIGS. 1 and 2 to potentially modify or add to the packet information for a packet. In various implementations, the example redirection information 300 of FIG. 3 can be stored in a memory, such as a type of RAM. Alternatively, the redirection information 300 can be stored in a combinatorial logic circuit, such as an "if-then-else" circuit, a case selection circuit, a decision tree, or some other type of combinatorial circuit. In various implementations, the redirection information 300 can be programmed by a local processor, where the local processor can program individual entries with one or more alternate actions for various possible actions 304, a class 306, and/or a mirror indicator 308 for various decision types 302. In various implementations, entries in the redirection information 300 can include values not illustrated here, such as priorities, different mirror locations, and/or mirror rates, among other things.

In various implementations, the redirection information 300 can include an entry for each possible decision type 302, or for a subset of possible decision types 302. As discussed above, a decision type can be an identification or classification for a packet. Alternatively, a decision type can be a value indicating a reason a forwarding decision could not be completely determined, also referred to herein as an event. In the example of FIG. 3, several different packet classifications are illustrated. For example, a "Broadcast Packet" classification indicates that a packet should be broadcast, meaning sent to all available packet recipients. As another example, a "Multicast Packet" classification indicates that a packet should be multicast, meaning sent to a group of recipients. In other examples, the redirection information 300 can be indexed by an event type, where event types can be, for example, a parsing error, a parity error, or an invalid table entry error, among others. In most cases, a redirection 300 table is only indexed by one or another decision type.

In the illustrated example, each entry in the redirection information 300 includes one or more alternate actions 304. In the illustrated example, the redirection information 300 can provide alternate actions for each of the LOG, TRAP, and DENY actions 304, the operation of which are discussed further below with respect to FIGS. 4A-4D.

In some cases, the redirection information 300 of FIG. 3 may be programmed to provide the same action, rather than an alternate action, for a particular decision type 302. For example, in the illustrated example, the entry for "Broadcast Packet" provides the same action for each of the possible actions 304 (e.g., for an input LOG action, the alternate action is a LOG action; for an input TRAP action, the alternate action is a TRAP action; and, for the DENY action, the alternate action is the DENY action). In other cases, the redirection information 300 can be programmed to provide an alternate action for a particular decision type 302. For example, for the "Source MAC Unknown (learn)" decision type, an alternate action (TRAP) is provided for the LOG action. As another example, for the "MPLS Hit" action, alternate actions (DENY) are provided for both the LOG and TRAP actions. As another example, for the "MPLS Miss" action, an alternate action (TRAP) is provided for the DENY action.

In some implementations, not every type of action can be redirected to any other action type. For example, in some cases, an input action may be DENY or TRAP because forwarding information for an associated packet could not be determined. In these cases, the DENY and TRAP cannot be changed to LOG, because LOG results in forwarding the associated packet. In this example, a DENY action can only be changed to TRAP, and a TRAP action can only be changed to a DENY. LOG, TRAP, and DENY are a few example actions. In various implementations, the redirection information 300 can include other actions.

In some implementations, each entry in the redirection information 300 can also include a class 306. The class 306 can be an alphanumeric value that can be assigned to packets that have a particular decision type, regardless of whether the redirection information 300 is configured to provide an alternate action 304. The class 306 can be used, for example, by a local processor to classify and/or prioritize packets sent to the local processor. In some cases, the class 306 provided by the redirection information 300 can override a class specified in the packet information for a particular packet. In some implementations, the packet information can include a flag or bit or other indicator that prevents the class 306 from the redirection information 300 from overriding a class in the packet information.

In some implementations, each entry in the redirection information 300 can also include a mirror indicator 308. The mirror indicator 308 can be configured to cause packets with some decisions types to be mirrored. Mirroring typically involves generating a copy of a packet, and sending the copy to a particular location. The location can be, for example, a local processor, or a particular Internet Protocol (IP) address in the network. The IP address in the network can, for example, be associated with network monitoring and analysis tools. The mirror indicator 308 can be set to mirror packets with certain decision types, regardless of the action associated with the decision type, or of an alternate action that may be programmed for the decision type. Thus, in some cases, packets that are going to be dropped (e.g., because of a TRAP or DENY action) can be mirrored. Additionally, in some cases, control packets (e.g., packets dropped, with a copy sent to the local processor) can be mirrored. In various implementations, a class 306, as provided by the redirection information 300, can be included in the copy of the packet generated due to mirroring. In some implementations, an entry in the redirection information 300 can also specify a mirror location (e.g., an IP address to which a packet should be mirrored), and/or a mirror rate (e.g., the rate at which packet whose decision type match to the entry should be mirrored).

As discussed above, the redirection information 300 can be indexed using a decision type 302, which can be part of a forwarding decision provided by the packet information for a particular packet. From a particular index, a redirection circuit can read an entry from the redirection information 300. In the illustrated example, an entry provides (among other things) alternate actions 304 for each decision type 302. For example, the decision type 302 may be "MPLS Hit," and the entry in the redirection information 300 for "MPLS Hit" can provide the alternate action 304 DENY for each of the LOG, TRAP, and DENY actions. In these examples, an alternate action can be selected using an original action provided by the forwarding decision. Continuing the previous example, the original action may be TRAP, in which case the alternate action is DENY. Alternatively, the original action may be DENY, in which case the alternate action is DENY, meaning that the original action has not been changed.

As another example, the decision type for a particular packet may be "MPLS Miss." In this example, the class for the packet can be set to "7." This class can be used, for example, to identify a particular processor queue or priority, where, should a copy of the packet be sent to the local processor, the processor can identify the packet based, at least in part, on the class. Continuing this example, the mirror indicator for the packet can also be set to "Yes," to indicate that the packet should be mirrored. Mirroring can occur irrespective of whether the packet is forwarded, dropped, sent to the local processor, or not sent to the local processor. As discussed further below, the mirror destination can be specified using hardware associated with a packet buffer.

In various implementations, a redirection circuit can include one or more sets of redirection information, each possibly configured in different ways. For example, the redirection circuit can include redirection information with only one entry. As another example, the redirection circuit can include redirection information that is indexed using a packet type instead of a decision type. In these and other examples, the redirection circuit may be able to determine multiple modifications or additional values for packet information for a packet. In some cases, such a redirection circuit may prioritize and/or consolidate the multiple modifications.

FIGS. 4A-4D illustrate an example of a packet processing circuit 400, several example actions the packet processing circuit 400 can determine for an input packet 402, and the path(s) packets can take based on each action. In various implementations, the packet processing circuit 400 can determine a forwarding decision for an input packet 402. As discussed above, the forwarding decision can include a decision type and/or an action, where the action can include a value indicating whether to forward the packet and/or a value indicating whether to send a copy of the packet to a local processor. The decision type can describe an identification or a classification for a packet, or can describe an event, that is, a reason a forwarding decision for the packet could not be completely determined.

An action can further describe a path or paths a packet can take in exiting the packet processing circuit 400. FIGS. 4A-4D illustrate a few possible actions that can be determined by a packet processing circuit, to illustrate examples of the paths a packet can take based on an action. In various implementations, a packet processing circuit can be implemented that determines other actions that result in packets taking paths other than those illustrated here.

In various implementations, the packet processing circuit 400 can receive an input packet 402 at an ingress port 422. "Ingress," in this context, refers to the port's ability to receive packets from a network. In various implementations, a single port may be capable of both receiving and transmitting packets. The ingress port 422 may be one of many ports. For example, a device that includes the packet processing circuit 400 can include 32, 64, 128, or more ports.

In various implementations, the ingress port 422, or some hardware associated with the ingress port 422, may parse the input packet 402 and produce packet information 406 for the packet. As discussed above, the packet information 406 can include fields from a header of the input packet 402. In some cases, the packet information 406 can also include values extracted from a payload of the input packet 402. The packet information 406 can be provided to a decision pipeline. The ingress port 422, or hardware associated with the ingress port 422, may transfer the complete contents of the packet 404 to a packet buffer 412.

The decision pipeline 410 can determine forwarding information for the input packet 402. The forwarding information can include, for example, a network destination for the input packet 402 and/or information describing a route the packet 402 can traverse through the network to reach a destination. Determining the forwarding information can include identifying or classifying the packet 402, such as for example identifying a network protocol that pertains to the packet 402, a broadcast, multicast, or unicast transmission type for the packet 402, and/or switching and/or routing determinations for the packet 402, among other things. Determining the forwarding information can also include determining an action 414, where the action 414 indicates whether the input packet 402 can be forwarded to a destination, should be dropped, and/or should be sent to a local processor.

In some cases, the decision pipeline 410 may not be able to determine the forwarding information. For example, the decision pipeline 410 may not have the necessary address information, or may not be configured to process the network protocol being used by the input packet 402, or a parity error may have occurred during a forwarding table look-up for the input packet 402, among other things. In these and other examples, the action 414 may reflect the decision pipeline's 410 inability to process the packet. For example, the action 414 may indicate that the packet should be dropped. Alternative or additionally, the action 414 may indicate that the should be sent to the local processor, which may be able to supply the information that the decision pipeline 410 did not have, and may further be able to update the decision pipeline 410 so that the decision pipeline 410 can process such packets in the future. The decision pipeline's 410 inability to process the packet may also be reflected in a decision type provided with a forwarding decision.

The decision pipeline 410 can provide a forwarding decision 426 to an egress port 424, or hardware associated with the egress port 424. "Egress" refers to the port's ability to transmit packets onto a network. In various implementations, the egress port 424 may also be able to function as an ingress port. In various implementations, the egress port 424 can be one of many egress ports. The forwarding decision 426 can be used by hardware associated with the egress port 424 to select the egress port 424 from among many egress ports. The forwarding decision 426 can also be included in an output packet 408, to be used by other network devices to get the packet to an ultimate destination.

The decision pipeline 410 can also provide at least part of the forwarding decision 428 to the packet buffer 412, or hardware associated with the packet buffer 412. The packet buffer 412, or associated hardware, can use this part of the forwarding decision 428 to determine, as illustrated in FIGS. 4A-4D, a path for the contents of a packet.

Figure 4A:
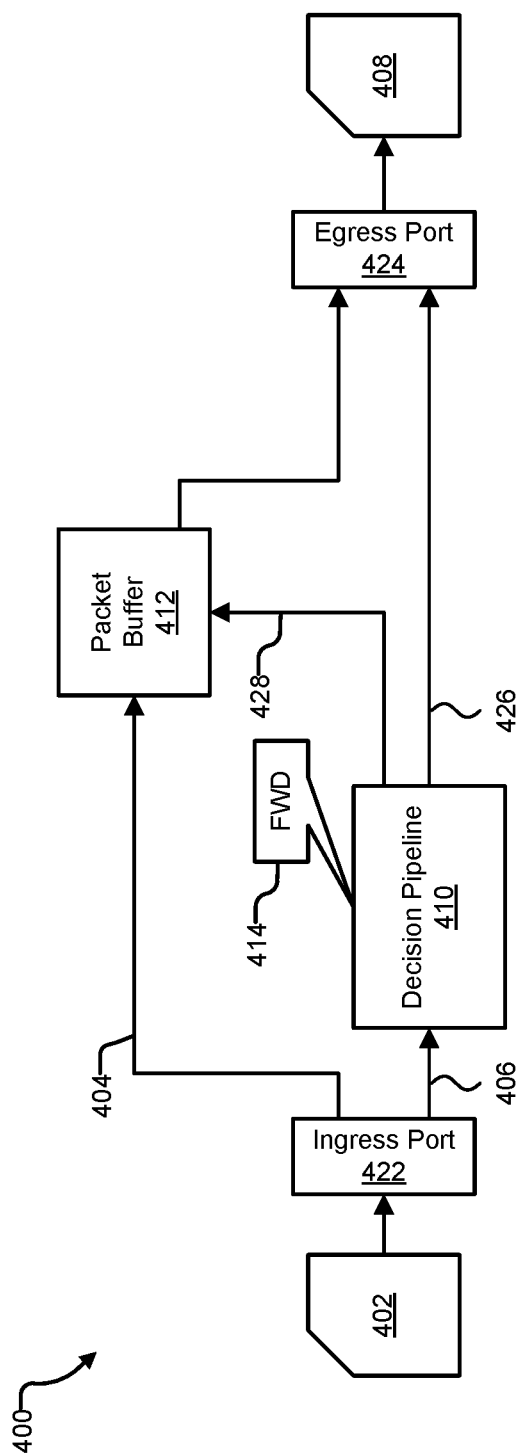
FIGS. 4A-4D illustrate an example of a packet processing circuit, several example actions the packet processing circuit can determine for an input packet, and the path(s) packets can take based on each action.

In the example illustrated in FIG. 4A, the decision pipeline 410 determines that the action 414 for the input packet 402 is to forward the input packet 402, which is referred to herein as FWD action. Forwarding the input packet 402 means transmitting the input packet 402 to a network destination. The network destination may be a destination specified by the input packet 402 (for example, in the input packet's 402 header), may be an intermediate destination to an ultimate destination, or may be a destination determined by the decision pipeline 410.

In the illustrated example, the FWD action 414 can be provided in the forwarding decision 428 that is provided to the packet buffer 412. The packet buffer 412 can, based on the FWD action 414, provide the contents of the packet 404 to the egress port 424. The contents of the packet 404 can then be included in an output packet 408. The output packet 408 can also include the forwarding decision 426 determined by the decision pipeline 410.

Figure 4B:
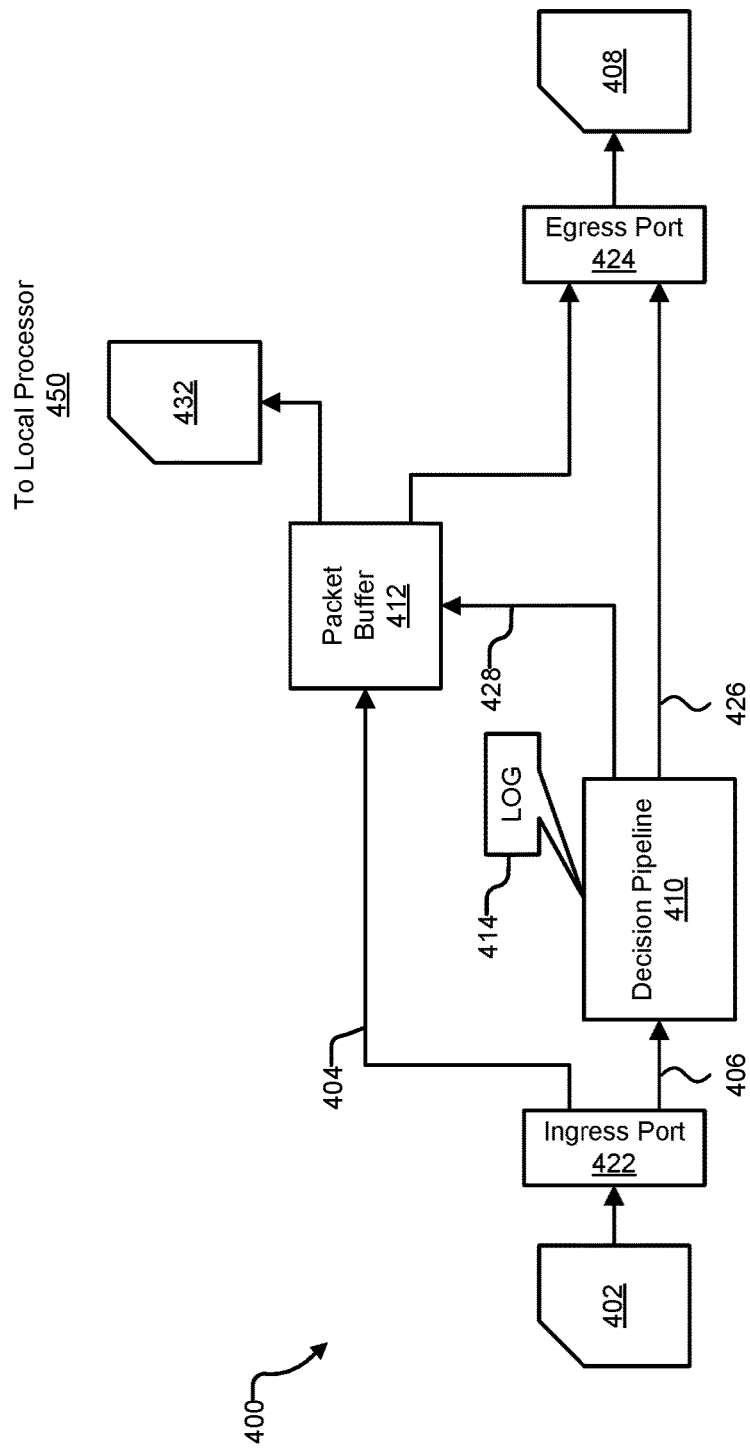

In the example illustrated in FIG. 4B, the action 414 determined by the decision pipeline 410 is to forward the input packet 402, and to also send a copy to a local processor 450, an action referred to herein as a LOG action. The packet buffer 412, or hardware associated with the packet buffer 412, can, based on the LOG action, provide the contents of the packet 404 to the egress port 424, for including in an output packet 408. The packet buffer 412, or associated hardware, can also provide the contents of the packet 404 in a copy of the packet 432 that is sent to a local processor 450. The LOG action may be used in cases where the decision pipeline 410 can determine forwarding information for the input packet 402, but the input packet is of some particular interest to the local processor 450. For example, when the decision pipeline 410 determines that a source MAC address in the input packet 402 is not known (e.g., the decision pipeline 410 does not have the source MAC address in any routing table), the input packet 402 can be sent to the local processor 450, which can manage the learning of the unknown source MAC address. In this example, not knowing the source MAC address may not be an obstacle to forwarding the input packet 402 to a network destination.

Figure 4C:
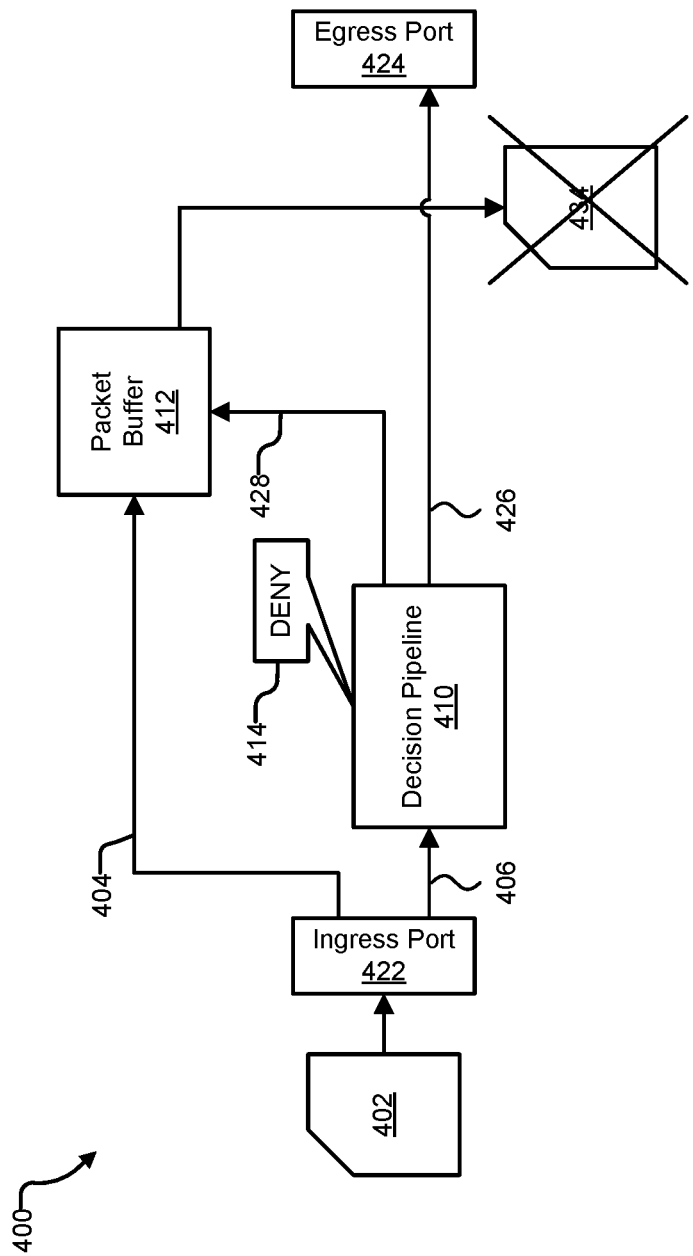

In the example illustrated in FIG. 4C, the action 414 determined by the decision pipeline 410 is to drop the input packet 402, an action referred to herein as a DENY action. To execute the DENY action, the packet buffer 412, or associated hardware, can delete, invalidate, or otherwise dispose of the contents of the packet 434. Once the contents of the packet 434 have been dropped, the input packet 402 can no longer be recovered from the packet buffer 412. The DENY action can be used in various cases where the input packet 402 need not be forwarded to another destination. For example, the input packet 402 has a destination address that is invalid or unknown, in which case the packet processing circuit 400 will drop the input packet 402 instead of forwarding the input packet 402. As another example, the decision pipeline 410 may encounter an error while processing the input packet 402, which can result in the decision pipeline being unable to determine forwarding information for the input packet 402. In this example, the packet processing circuit 402 may have to drop the input packet 402.

Figure 4D:
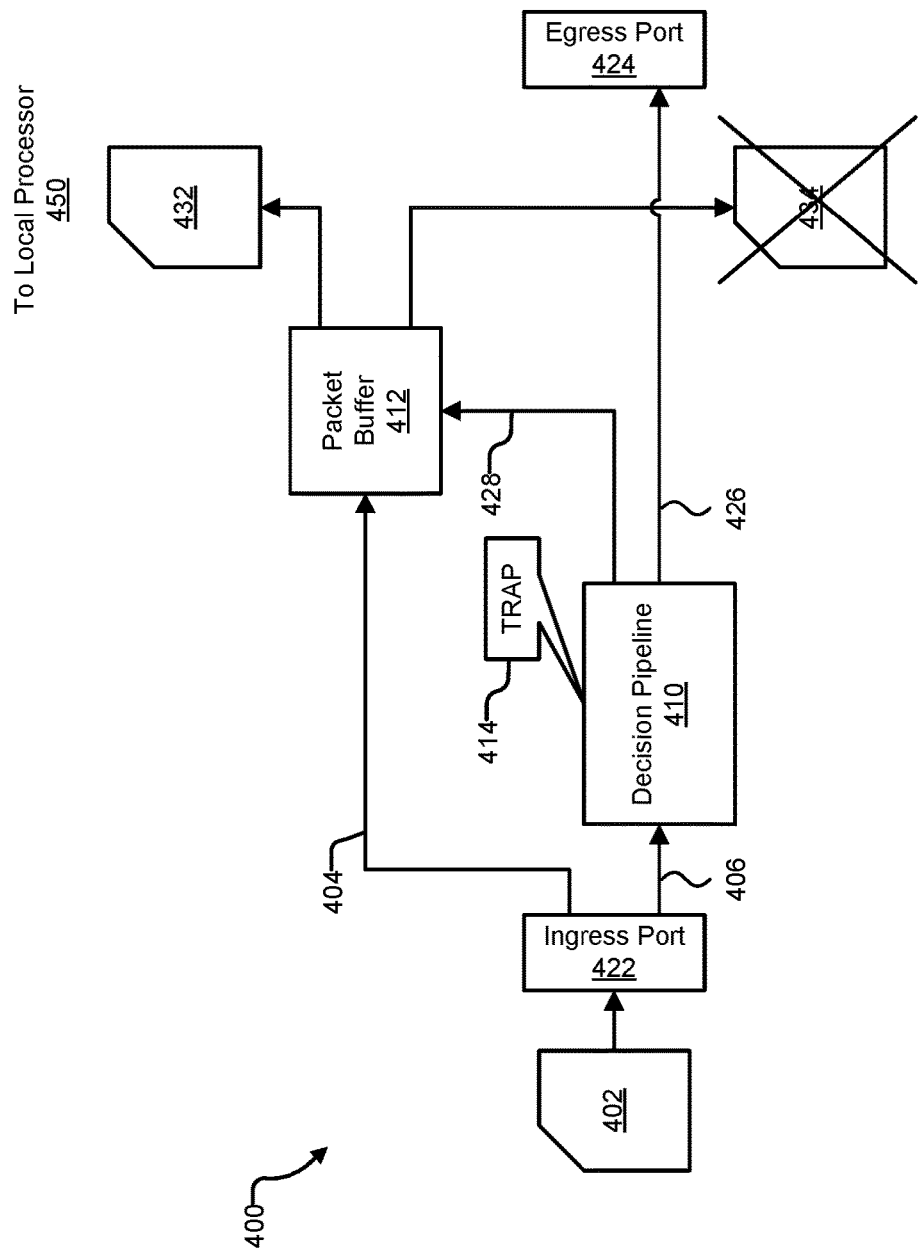

In the example illustrated in FIG. 4D, the action 414 determined by the decision pipeline is to drop the input packet 402 and also send a copy of the packet 432 to the local processor 450, an action referred to herein as a TRAP action. The packet buffer 412, or associated hardware, can drop the contents of the packet 434, and also send a copy of the packet 432 to a local processor 450. The TRAP action can be used in various cases where the decision pipeline 410 determines that input packet 402 will go to the local processor 450 and also be dropped. For example, the input packet 402 may be a control packet with information for the local processor 450, and once the local processor 450 has this information, the input packet 402 need not be forwarded to any other destination, and thus can be dropped. The TRAP action can also be used in cases where the input packet 402 will be dropped and should also be examined by the local processor 450. For example, the decision pipeline 410 may have experienced an error in processing the input packet 402, such that the decision pipeline 410 is unable to determine forwarding information for the input packet 402 and can only drop the input packet 402. In this example, the local processor 450 can be used to examine the input packet 402, and possibly determine why the decision pipeline 410 was unable to process the input packet 402.

FIGS. 4A-4D illustrate just a few examples of various actions that can be determined for a packet, and the paths the packet can take as a result of the action. As discussed above, in various implementations, the path of the packet can be changed, for example for debugging purposes or security analysis purposes.

FIGS. 5A-5E illustrate an example of a packet processing circuit 500 that includes a redirection 530 circuit, and several examples where the redirection 530 circuit has been configured to redirect a packet from the path determined by a decision pipeline 510 to an alternate path. In various implementations, the packet processing circuit 500 can determine a forwarding decision for an input packet 502. As discussed above, the forwarding decision can include a decision type and/or an action, where the action can indicate whether to forward the packet and/or whether to send a copy of the packet to a local processor. FIGS. 5A-5E illustrate a few possible actions, paths that a packet can take based on these actions, and alternate actions that can be determined by a redirection circuit. In various implementations, a packet processing circuit can be implemented that determines other actions, and that includes a redirection circuit that determines alternate actions other than those illustrated here.

In various implementations, the packet processing circuit 500 can receive an input packet 502 at an ingress port 522, which may be one of many ports. In various implementations, the ingress port 522, or some hardware associated with the ingress port 522, may parse the input packet 502 and produce packet information 506 for the packet. The packet information 506 can be provided to a decision pipeline. The ingress port 522, or hardware associated with the ingress port 522, may transfer the complete contents of the packet 504 to a packet buffer 512.

The decision pipeline 510 can determine forwarding information for the input packet 502. The forwarding information can include, for example, a network destination for the input packet 502 and/or information describing how the packet 502 can traverse the network to reach a destination. The forwarding information can also include an action 514, where the action 514 indicates whether the input packet 502 can be forwarded to a destination, should be dropped, and/or should be sent to a local processor. In some cases, the decision pipeline 510 may be unable to determine forwarding information, which may be reflected in the action 414 and/or in the forwarding decision 526 output by the decision pipeline 510.

The decision pipeline 510 can provide a forwarding decision 526, including an action 514 to a redirection 530 circuit. In various implementations, the redirection 530 circuit can be programmed to change the action 514 to an alternate action 538. In some cases, the redirection 530 circuit may be programmed to leave the action 514 unchanged. In these cases, the alternate action 538 can be the same as the original action 514. The redirection 530 circuit can provide the forwarding decision 526 to an egress port 524, or hardware associated with the egress port 524, which may be one of many ports. The forwarding decision 526 can be used by hardware associated with the egress port 524 to select the egress port 524 from among many egress ports. The forwarding decision 526 can also be included in an output packet 508, to be used by other network devices to get the packet to an ultimate destination.

The redirection 530 circuit can also send at least some of the forwarding decision 528, to the packet buffer 512, or hardware associated with the packet buffer 512. The packet buffer 512, or associated hardware, can use the forwarding decision 528 to determine, as illustrated in FIGS. 5A-5E, a path for the contents of a packet.

Figure 5A:
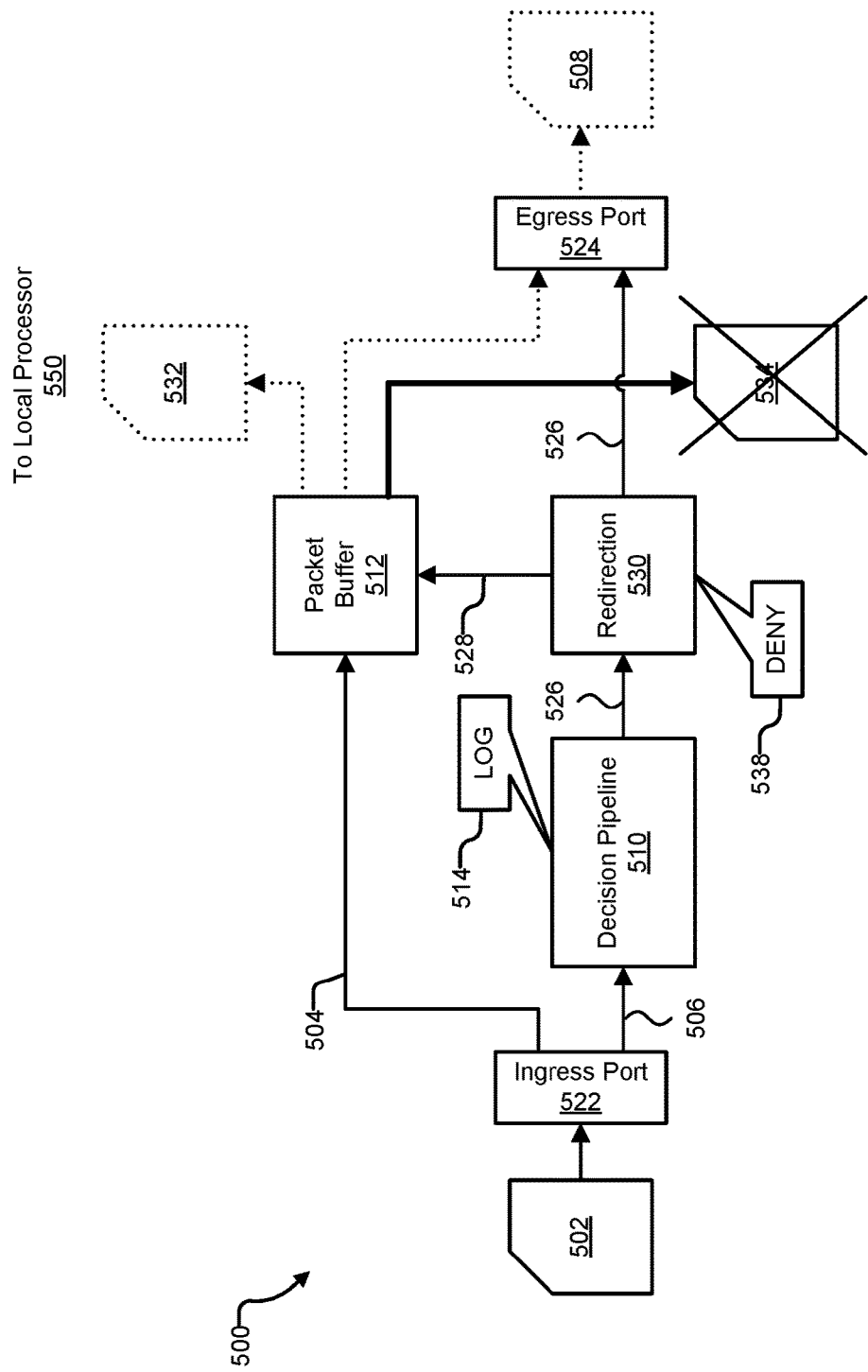
FIGS. 5A-5E illustrate an example of a packet processing circuit that includes a redirection circuit, and several examples where the redirection circuit has been configured to redirect a packet from the path determined by a decision pipeline to an alternate path.

In the example illustrated in FIG. 5A, the decision pipeline 510 determines that the action 514 for the input packet 502 is the LOG action, which, as used herein, means forwarding the input packet 502 as an output packet 508 and sending a copy of the packet 532 to a local processor 550. In this example, the redirection 530 circuit has been configured to change the LOG action 514 to a DENY action 538 for at least the particular input packet 502. Changing the LOG action 514 to the DENY action 538 can be based on the decision type determined for the input packet 502 by the decision pipeline 510. As discussed above, the redirection 530 circuit can include a circuit that stores entries for one or more possible decision types. The redirection 530 circuit can index this circuit using the decision type that is included in the forwarding decision 528. In various implementations, an entry read from the circuit can include one or more alternate actions. In this example, the LOG action 514, determined by the decision pipeline 510, selects the DENY action 538.

Should the packet buffer 512, or hardware associated with the packet buffer 512, have received the LOG action 514 from the decision pipeline 510, the packet buffer 512 (or associated hardware) would have forwarded the input packet 502, as an output packet 508, through the egress port 524, where a destination for the output packet 508 can be provided by the forwarding decision 526. The packet buffer 512 would have also sent a copy of the packet 532 to the local processor 550. The redirection 530 circuit, however, provides the packet buffer 512 with the DENY action 538. Thus, instead of forwarding an output packet 508 and sending a copy of the packet 532 to the local processor 550, the packet buffer 512 will drop the input packet 502, meaning the contents of the packet 534 will be removed from the packet buffer 512 and be deleted or otherwise disposed of.

The redirection 530 circuit can be configured to change the LOG action 514 to the DENY action 538 in cases where the input packet 520 should neither be forwarded nor sent to the local processor 550. For example, forwarding decisions by the decision pipeline 510 for a particular type of network traffic may be incorrect, and the redirection 530 circuit may be configured to drop all packets until the configuration of the decision pipeline 510 can be corrected. As another example, packets with unknown source addresses, for which the decision pipeline can determine a destination, may be dropped as a security measure, until the source addresses can be verified and declared safe or not safe.

Figure 5B:
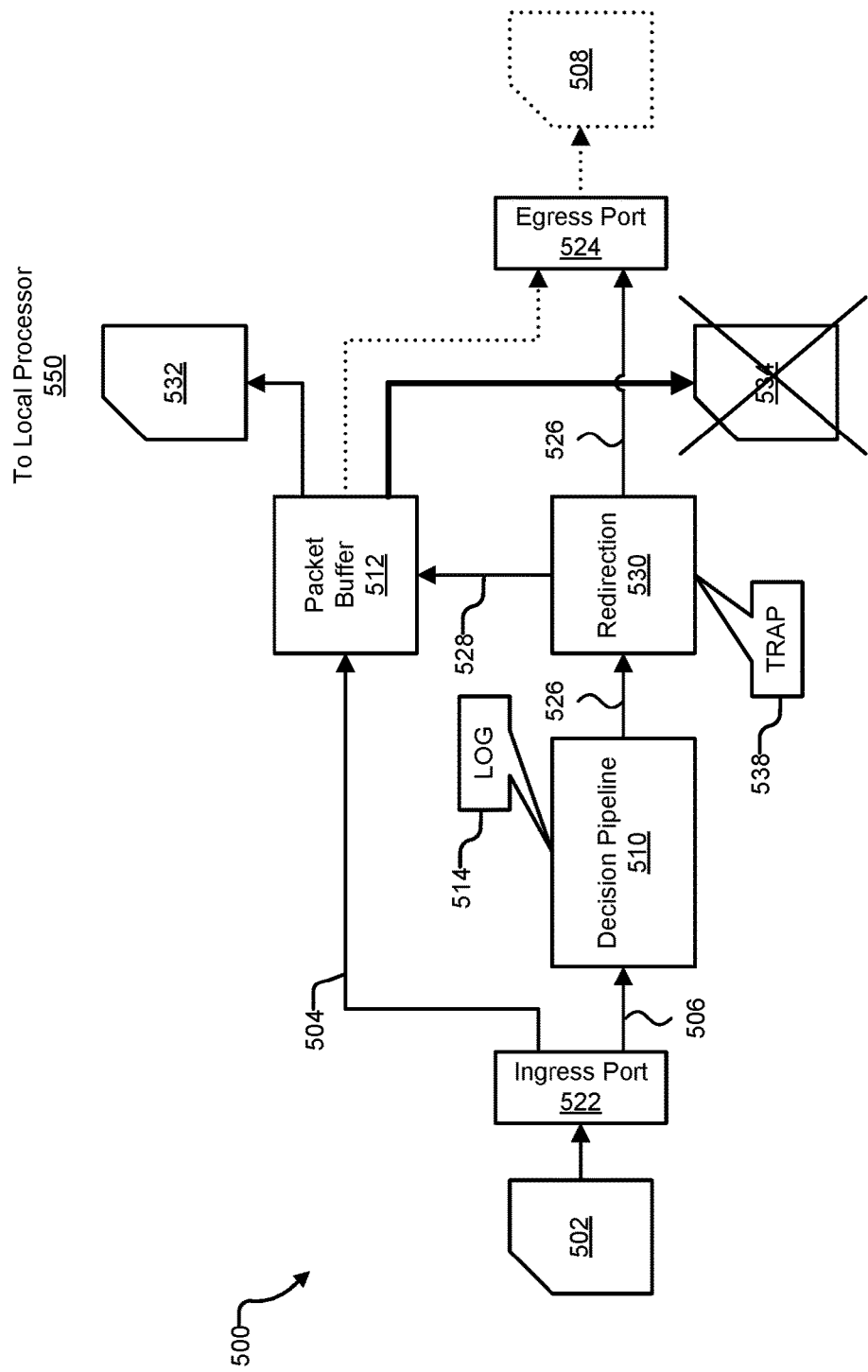

In the example illustrated in FIG. 5B, the decision pipeline 510 determines that the action 514 for the input packet 502 is the LOG action. Also in this example, the redirection 530 circuit has been configured to change the LOG action 508 to the TRAP action 538, at least for this particular input packet 502. Changing the LOG action 508 to the TRAP action 583 can be based on a decision type determined for the input packet 502 by the decision pipeline 510.

The LOG action 514 from the decision pipeline 510 would have caused the packet buffer 512, or associated hardware, to forward an output packet 508 and send a copy of the packet 532 to the local processor 550. The packet buffer 512, however, receives the TRAP action 538, which causes the packet buffer 512 to still send a copy of the packet 532 to the local processor 550, but to also drop the contents of the packet 534 instead of sending an output packet 508. The LOG action 514 may be changed to the TRAP action 538 in cases where, for example, some packets are being forwarded incorrectly, and the reason for the incorrect forwarding is not understood. In this example, these packets can be copied to the local processor 550 for analysis, and also be dropped to prevent the packets from reaching an incorrect destination.

Figure 5C:
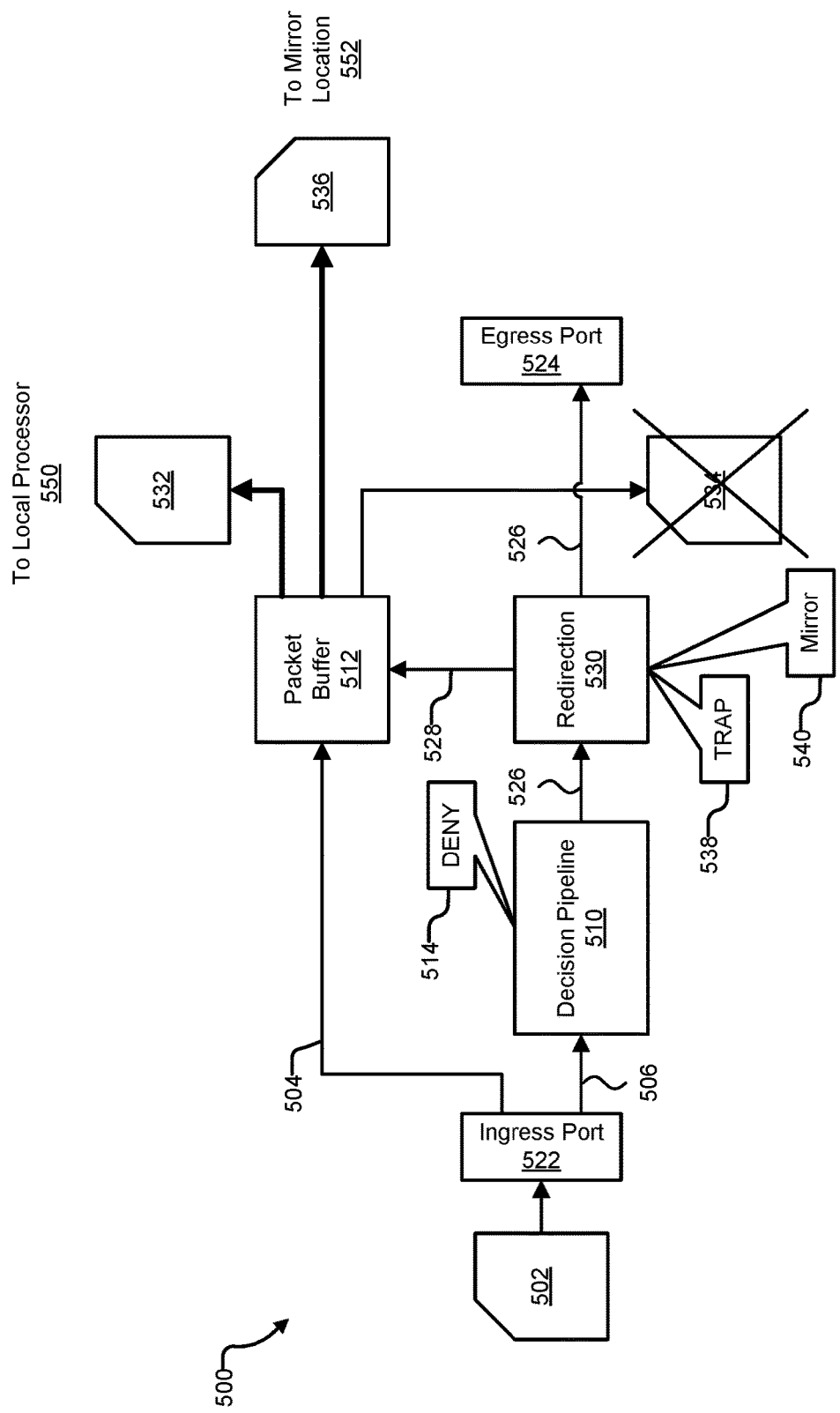

In the example illustrated in FIG. 5C, the decision pipeline 510 determines that the action 514 for the input packet 502 is the DENY action. The redirection 530 circuit subsequently changed the DENY action 514 to the TRAP action 538. In either case, the contents of the packet 534 are dropped, but due to the TRAP action 538, a copy of the packet 532 is also sent to the local processor 550. The TRAP action 538 may be used, for example, to send a packet that would otherwise be dropped to the local processor 550 for analysis. In this example, the packet is still dropped, because the forwarding decision 526 for the packet may be incorrect or incomplete.

In this example, for the particular input packet 502, the redirection 530 circuit was also programmed to mirror 540 the input packet 502. The redirection 530 circuit can send the mirror 540 indicator to the packet buffer 512 (or associated hardware). The packet buffer 512 can include hardware that generates a mirror copy 536 of the packet, and send the mirror copy 536 to a mirror location 552. In various implementations, the packet buffer 512 can be configured with one or more mirror locations, which can include the local processor 550 and/or one or more destinations on the network. In some implementations, the mirror location 552 can be selected using a class, where the class is looked up by the redirection 530 circuit along with the alternate action 538 and the mirror 540 indicator. In some implementations, the redirection 530 circuit can determine the mirror location from the same entry that provided the DENY action 538. In some cases, to send the mirror copy 536 to a destination on the network, hardware associated with the packet buffer 512 can generate encapsulation headers for the mirror copy 536, so that the original headers from the input packet 502, or headers as modified by the decision pipeline 510 are preserved.

Figure 5D:
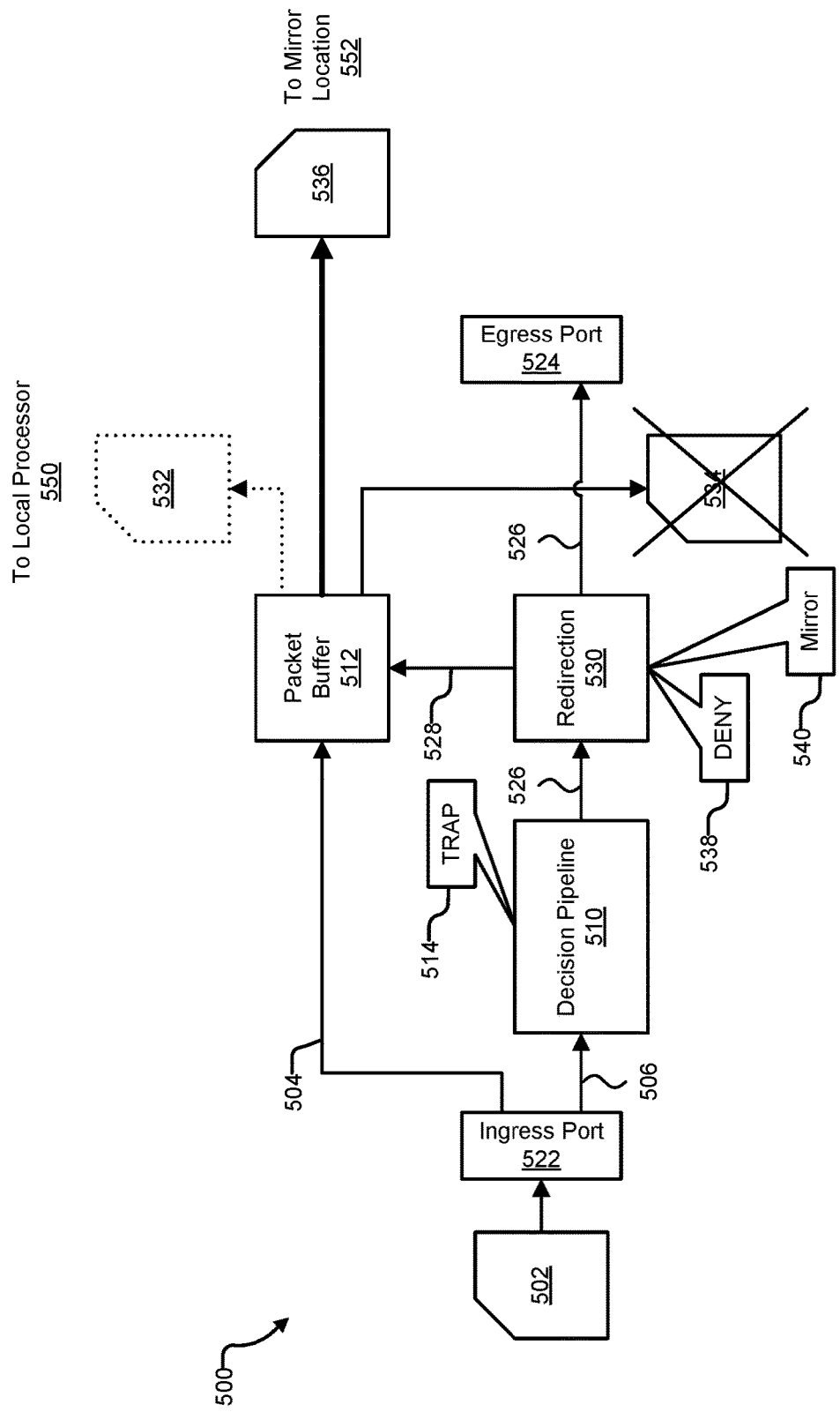

In the example illustrated in FIG. 5D, the decision pipeline 510 determines that the action 514 for the input packet 502 is the TRAP action. The redirection 530 circuit subsequently changed the TRAP action 514 to the DENY action 538. In either case, the contents of the packet 534 are dropped, but the TRAP action 514 would have caused a copy of the packet 532 to be sent to the local processor. Due to the TRAP action 514 being changed to the DENY action, the copy of the packet 532 is not sent to the local processor 550. The DENY action may be used in this way, for example, to reduce the number of packets going to the local processor 550.

In this example, the redirection 530 circuit was also programmed to mirror 540 the input packet. As a result, the packet buffer 512 (or associated hardware) can generate a mirror copy of the packet 536, and send the mirror copy to a mirror location 552. Mirroring may be used, for example, for network traffic monitoring and analysis. Mirroring may be particularly useful when the packet processing circuit is dropping packets, so that copies can be collected for analysis. Mirroring to a network destination can provide a central location for collecting mirrored packets, and/or remove the burden of processing mirrored packets from the local processor 550.

Figure 5E:
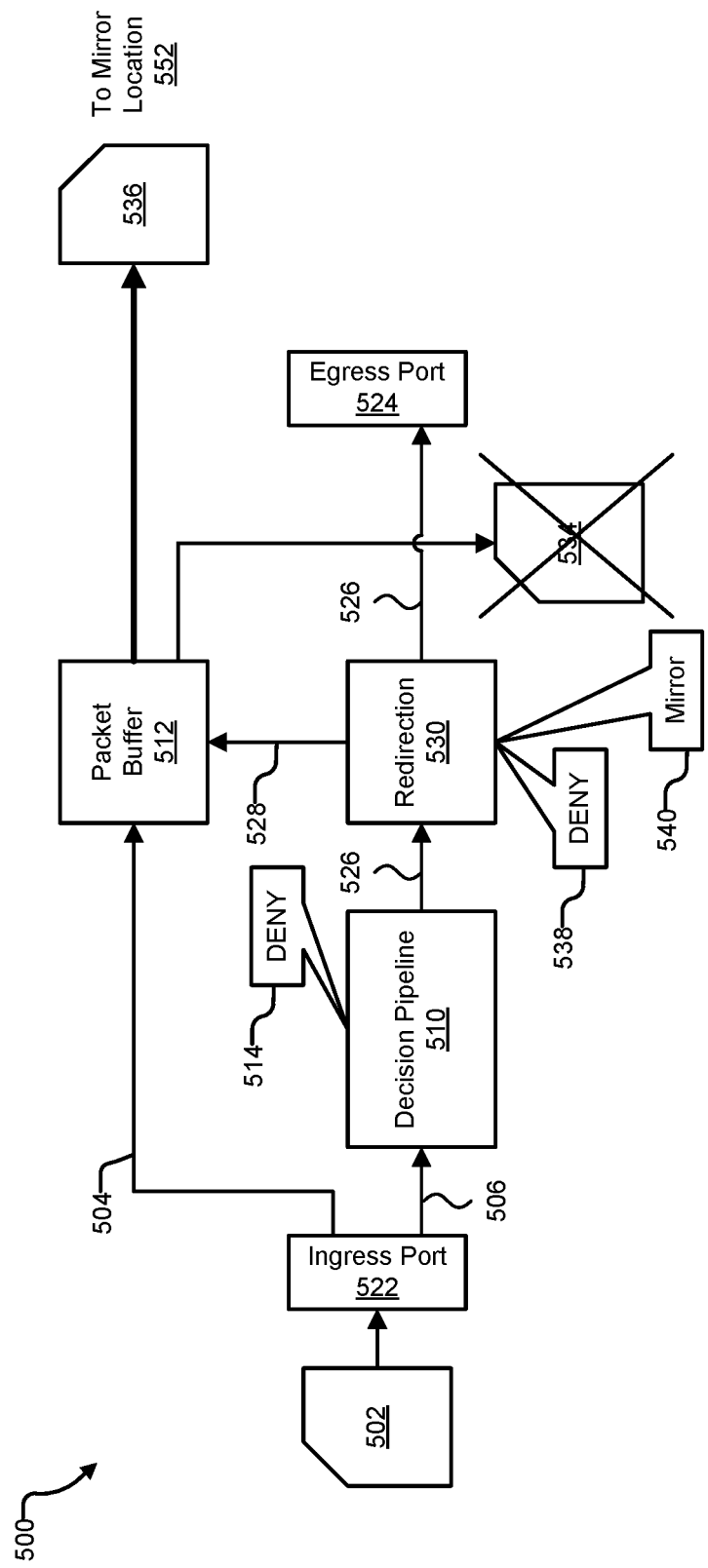

In the example illustrated in FIG. 5E, the decision pipeline 510 determines that the action 514 for the input packet 502 is the DENY action. In this example, the redirection 530 circuit also determines that the action 538 for the input packet 502 is the DENY action, such that the action for the input packet 502 is not changed.

The redirection 530 circuit, however, determines to mirror 540 the input packet. Thus, though the DENY action causes the packet 534 to be dropped, the packet buffer 512 creates a copy of the packet 536, and causes the mirror copy to be sent to a mirror location 552. In this example, mirroring may be used to analyze packets that are being dropped to determine a reason that the packets are being dropped. Alternatively or additionally, the packets may be mirrored to collect statistics and data about dropped packets. Though, as in the example of FIG. 5C, the local processor 550 can be used to analyze dropped packets, in some cases it may be desirable to conduct this analysis elsewhere, or there may be monitoring devices in the network specifically configured to collect certain dropped packets.

Figure 6:
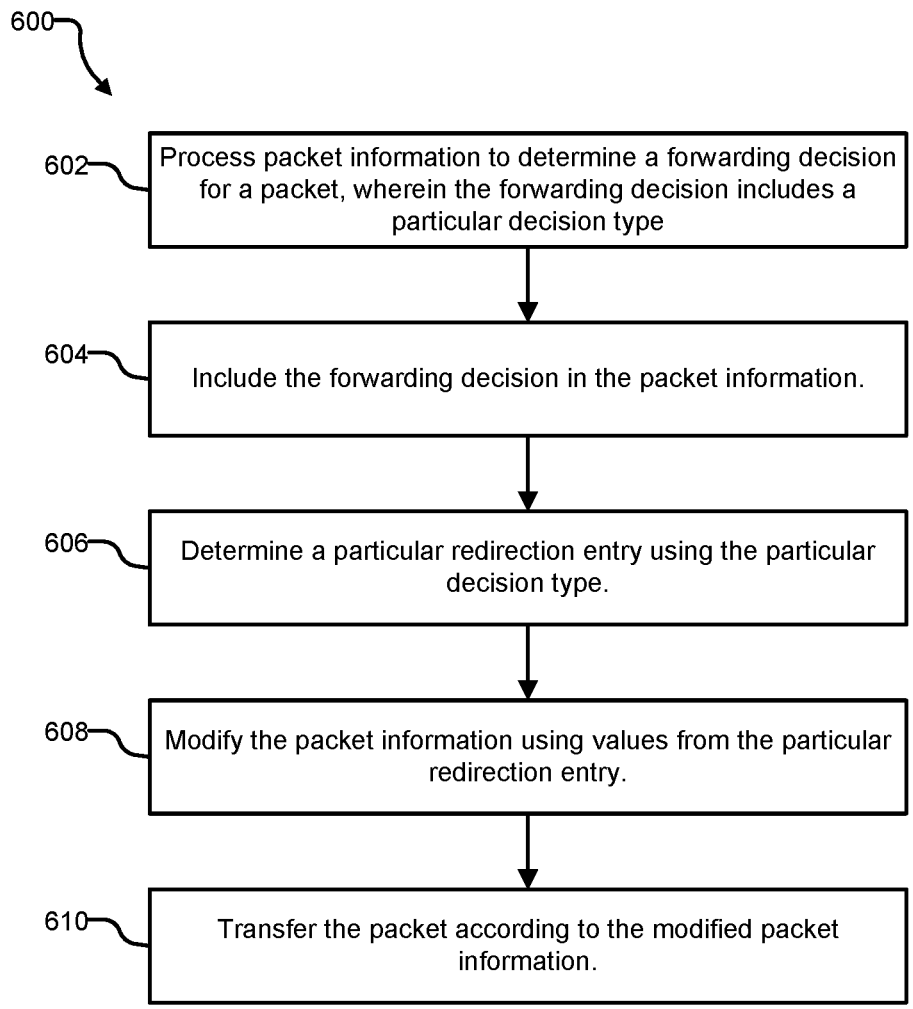
FIG. 6 illustrates an example of a process that can be implemented by a redirection circuit to modify the forwarding decision for a packet.

FIG. 6 illustrates an example of a process 600 that can be implemented by a redirection circuit to modify the forwarding decision for a packet. The example process 600 can be implemented by the systems described above, such as for example the redirection circuits of FIGS. 1 and 2, or the packet processing circuits of FIGS. 4A-4D or FIGS. 5A-5D.

At step 602 of FIG. 6, the process 600 includes processing packet information to determine a forwarding decision for a packet, wherein the forwarding decision includes a particular decision type. The packet information can include values extracted from the packet, such as a field from a header of the packet. The forwarding decision can include a final determination as to whether to forward the packet from a network device and onto a network. The decision type can be an identification or classification for the packet. Alternatively, the decision type can be a value indicating a reason that the forwarding decision could not be completely determined.

Processing the packet information can be more efficient than processing the packet itself, since the packet information may be smaller in size. Processing the packet information to determine forwarding decision can include, for example, identifying a type of the packet, identifying a source of the packet, identifying a destination for the packet, and/or identifying a next hop in the network to a destination for the packet, as well as learning new addresses from the packet and checking the packet or its addressing information for errors. In various implementations, the packet can be processed by a packet processing circuit.

At step 604, the process 600 includes the forwarding decision in the packet information. The packet information can then be used by, for example, a redirection circuit to modify the forwarding information.

At step 606, the process 600 includes determining a particular redirection entry using the particular decision type. The particular redirection entry can be determined by indexing redirection information using the particular decision type. The redirection information can include an entry for each of one or more possible decision types. An entry can include, among other things, alternate actions, classes, mirror indicators, mirror locations, mirror rates, priorities, and/or quality of service information.

At step 608, the process 600 includes modifying the packet information using values form the particular redirection entry. Modifying the packet information can exclude modifying values in the packet information associated with an outbound packet header. A network device can generate and forward an output packet for the packet being processed by the process 600. The network device can further use value from the packet information to construct an outbound header for the outbound packet. At step 608, these values are generally not modified.

At step 610, the process 600 includes transferring the packet according to the modified packet information. Transferring the packet can include forwarding the packet onto a network or dropping the packet. Transferring the packet can alternatively or additionally include sending a copy of the packet to a local processor, or not sending a copy to the local processor.

In various implementations, the transferring of the packet can be executed by a packet buffering circuit. For example, the packet may be stored in a packet buffering circuit, which can include a memory for storing the packet and circuitry for transferring the packet according to the packet information.

Figure 7:
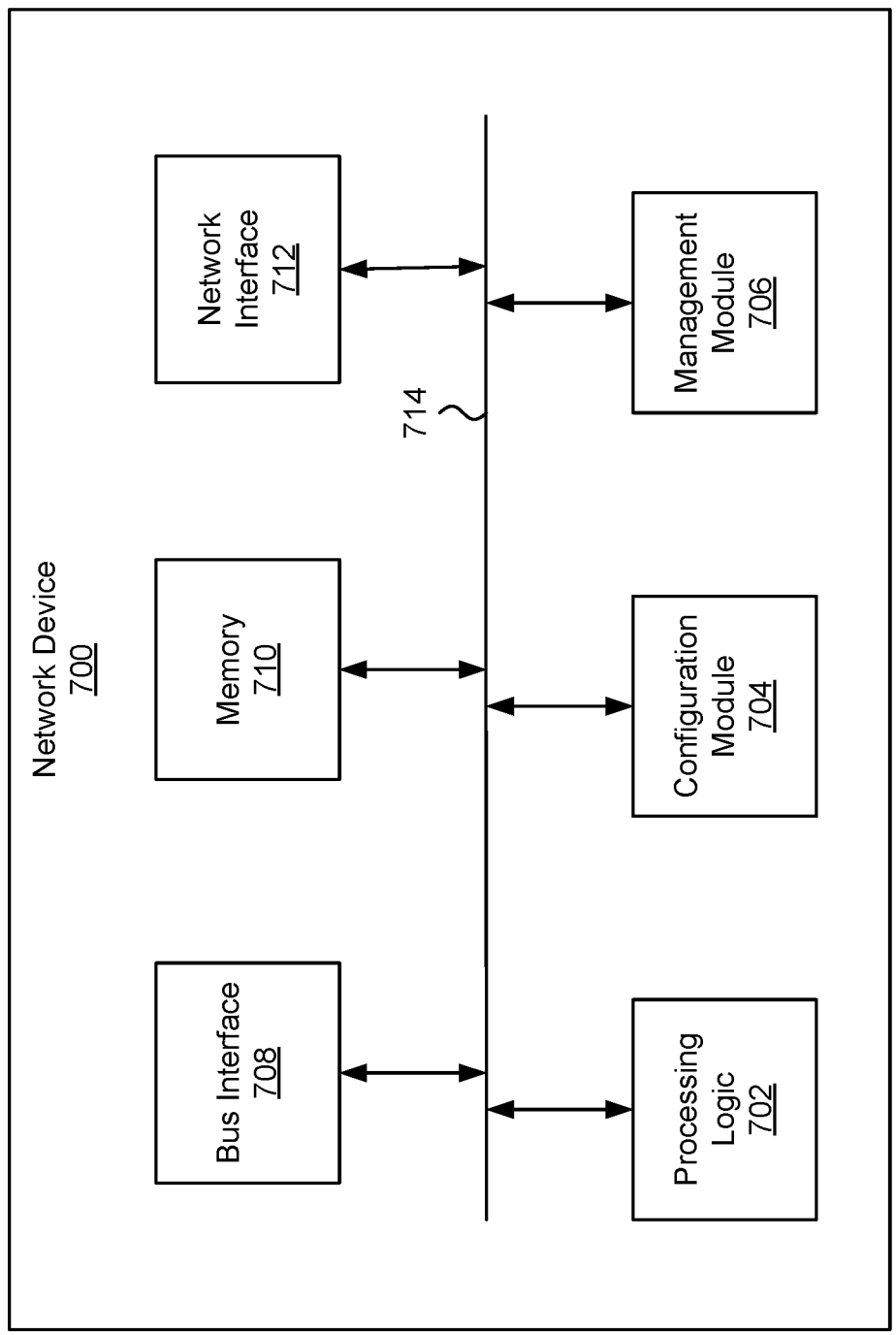
FIG. 7 illustrates an example of a network device, according to certain aspects of the disclosure.

FIG. 7 illustrates an example of a network device 700. In various implementations, the network device 700 can include the components described above, and/or the functionality of these components. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
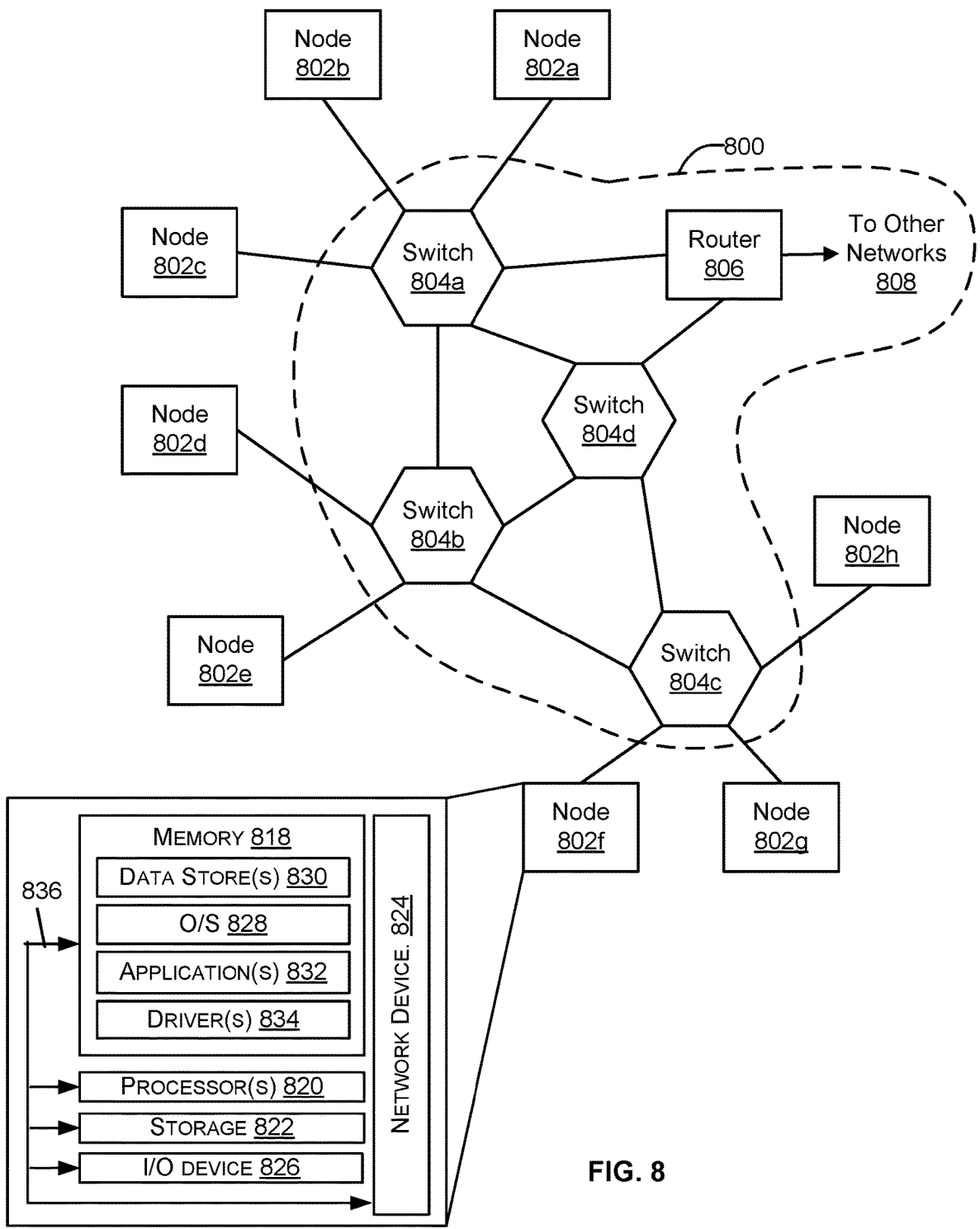
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804*a*-804*d*, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804*a*-804*d* may be connected to a plurality of nodes 802*a*-802*h* and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804*a*-804*d* and router 806, if present, may be referred to as a switch fabric, a fabric, a network fabric, or simply a network. In the context of a computer network, terms "fabric" and "network" may be used interchangeably herein.

Nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
   a pipeline circuit operable to:
      receive packet information for a packet, the packet information including a value extracted from the packet;
      process the packet information to determine a forwarding decision for the packet, the forwarding decision including a final determination whether to forward the packet from the integrated circuit device onto a network or to drop the packet, wherein the forwarding decision includes a particular decision type and a particular action; and
      include the forwarding decision in the packet information;
   a redirection circuit, wherein the redirection circuit includes a memory configured to store redirection information, wherein the redirection information includes, for each of one or more decision types, a respective redirection entry, wherein the respective redirection entry associates an alternate action with an action to be performed on a particular packet, and wherein the redirection circuit is operable to:
      receive the packet information from the pipeline circuit;
      index the memory using the particular decision type, wherein indexing the memory includes reading a particular redirection entry from the memory; and
      modify the packet information using values from the particular redirection entry, wherein modifying the packet includes replacing the particular action with a particular alternate action indicated by the particular redirection entry; and
   a packet buffering circuit, wherein the packet buffering circuit is operable to:
      store the packet;
      receive the packet information from the redirection circuit; and
      transfer the packet according to the modified packet information.

2. The integrated circuit device of claim 1, wherein transferring the packet includes forwarding the packet onto the network or dropping the packet.

3. The integrated circuit device of claim 1, wherein transferring the packet includes sending a copy of the packet to a local processor or not sending a copy of the packet to the local processor.

4. The integrated circuit device of claim 1, wherein the particular redirection entry includes a class, and wherein modifying the packet information includes adding the class to the packet information.

5. The integrated circuit device of claim 1, wherein the particular redirection entry includes a mirror indicator, and wherein transferring the packet includes:
   generating a copy of the packet; and
   sending the copy of the packet to a mirror location.

6. An integrated circuit device, comprising:
   an integrated circuit configured to store a plurality of redirection entries, wherein each redirection entry is indexed using a decision type, and wherein each redirection entry associates an alternate action with an action to be performed on a particular packet;
   wherein the integrated circuit device is operable to:
      receive packet information for a packet, the packet information including values extracted from the packet and a forwarding decision determined by a packet processing circuit of the integrated circuit device, the forwarding decision including a final determination whether to forward the packet from the integrated circuit device onto a network or to drop the packet, wherein the forwarding decision includes a particular decision type;
      use the particular decision type to select a particular redirection entry from the plurality of redirection entries, wherein determining the particular redirection entry includes using the particular decision type to index the integrated circuit; and
      modify the packet information using values from the particular redirection entry, wherein modifying the packet information excludes modifying values in the packet information used by the integrated circuit device to generate an outbound packet header, and wherein modifying the packet information causes the integrated circuit device to perform a particular alternate action specified by the particular redirection entry instead of a particular action indicated by the forwarding decision.

7. The integrated circuit device of claim 6, wherein the particular action includes one or more of a value indicating whether to forward the packet to the network, or a value indicating whether to send a copy of the packet to a local processor, and wherein modifying the packet information includes replacing the particular action with the particular alternate action.

8. The integrated circuit device of claim 6, wherein the particular redirection entry includes a class, and wherein modifying the packet information includes adding the class to the packet information.

9. The integrated circuit device of claim 6, wherein the particular redirection entry includes a mirror indicator, and wherein modifying the packet information includes adding the mirror indicator to the packet information.

10. The integrated circuit device of claim 6, wherein the redirection entry includes one or more of a mirror location, a mirror rate, or a priority.

11. The integrated circuit device of claim 6, wherein modifying the packet information includes changing a value that indicates that the packet is to be forwarded to a value that indicates that the packet is to be dropped.

12. The integrated circuit device of claim 6, wherein modifying the packet information includes changing a value that indicates that the packet is not to be sent to a local processor to a value that indicates that the packet is to be sent to the local processor, or changing a value that indicates that the packet is to be sent to the local processor to a value that indicates that the packet is not to be sent to the local processor.

13. The integrated circuit device of claim 6, wherein the particular decision type includes a value indicating a classification for the packet.

14. The integrated circuit device of claim 6, wherein the particular decision type includes a value indicating a reason the forwarding decision could not be determined.

15. The integrated circuit device of claim 6, wherein the forwarding decision includes a first action, wherein the particular redirection entry includes a first alternate action wherein the packet information includes a second forwarding decision, the second forwarding decision including a second decision type and a second action, and wherein the integrated circuit device is further operable to:
   determine use the second decision type to select a second redirection entry, wherein determining the second redirection entry includes using the second decision type to index the integrated circuit, and wherein the second redirection entry includes a second alternate action;
   select a third action from among the particular alternate action and the second alternate action; and
   modify the packet information using the third action.

16. The integrated circuit device of claim 6, wherein the forwarding decision is based on a header portion of the packet.

17. The integrated circuit device of claim 6, wherein the integrated circuit device is an Application Specific Integrated Circuit (ASIC), a Field Programmable Gate Array (FPGA) or a System-on-a-Chip (SoC).

18. A method, comprising:
   receiving, by an integrated circuit device, packet information for a packet, the packet information including values extracted from the packet and a forwarding decision determined by a packet processing circuit of the integrated circuit device, the forwarding decision including a final determination whether to forward the packet from the integrated circuit device onto a network or to drop the packet, wherein the forwarding decision includes a particular decision type;
   using the particular decision type to select a particular redirection entry from a plurality of redirection entries stored on the integrated circuit device, the plurality of redirection entries including a respective redirection entry for each of one or more decision types, wherein each redirection entry associates an alternate action with an action to be performed on a particular packet; and
   modifying the packet information using values from the particular redirection entry, wherein modifying the packet information excludes modifying values in the packet information used by the integrated circuit device to generate an outbound packet header, and modifying the packet information causes the integrated circuit device to perform a particular alternate action specified by the particular redirection entry instead of a particular action indicated by the forwarding decision.

19. The method of claim 18, wherein the particular action includes one or more of a value indicating whether to forward the packet to the network or a value indicating whether to send the packet to a local processor, wherein the particular redirection entry includes a plurality of alternate actions, and wherein modifying the packet information further includes:
   selecting, using the particular action, the particular alternate action from among the plurality of alternate actions, wherein modifying the packet information includes; and replacing the particular action with the particular alternate action.

20. The method of claim 18, wherein the redirection entry includes one or more of a class, a mirror indicator, a mirror location, a mirror rate, or a priority.

21. The integrated circuit device of claim 6, wherein the particular alternate action includes one or more of a value indicating whether to forward the packet to the network or a value indicating whether to send a copy of the packet to a local processor.

22. The integrated circuit device of claim 6, wherein, when the integrated circuit device includes the outbound packet header in the packet when forwarding the packet onto the network.

* * * * *

UNITED STATES PATENT AND TRADEMARK OFFICE
CERTIFICATE OF CORRECTION

PATENT NO. : 10,630,596 B1
APPLICATION NO. : 15/385256
DATED : April 21, 2020
INVENTOR(S) : Thomas A. Volpe, Mark Anthony Banse and Nafea Bshara Page 1 of 1

It is certified that error appears in the above-identified patent and that said Letters Patent is hereby corrected as shown below:

In the Claims

Column 31, Line 37, Claim 15:
Delete "determine use the second decision type to select a second"
Insert --determine use of the second decision type to select a second--

Column 32, Line 38, Claim 19:
Delete "includes; and replacing the particular action with the"
Insert --includes replacing the particular action with the--

Signed and Sealed this
Thirtieth Day of June, 2020

Andrei Iancu
*Director of the United States Patent and Trademark Office*